(12) United States Patent
Crispin et al.

(10) Patent No.: US 7,925,891 B2
(45) Date of Patent: *Apr. 12, 2011

(54) APPARATUS AND METHOD FOR EMPLOYING CRYPTOGRAPHIC FUNCTIONS TO GENERATE A MESSAGE DIGEST

(75) Inventors: Thomas A. Crispin, Austin, TX (US); G. Glenn Henry, Austin, TX (US); Terry Parks, Austin, TX (US)

(73) Assignee: Via Technologies, Inc., Taipei (TW)

( * ) Notice: Subject to any disclaimer, the term of this patent is extended or adjusted under 35 U.S.C. 154(b) by 1262 days.

This patent is subject to a terminal disclaimer.

(21) Appl. No.: 11/090,690

(22) Filed: Mar. 25, 2005

(65) Prior Publication Data

US 2005/0188216 A1 Aug. 25, 2005

Related U.S. Application Data

(63) Continuation-in-part of application No. 10/674,057, filed on Sep. 29, 2003, now Pat. No. 7,321,910.

(60) Provisional application No. 60/556,093, filed on Mar. 25, 2004, provisional application No. 60/571,122, filed on May 14, 2004, provisional application No. 60/582,422, filed on Jun. 24, 2004, provisional application No. 60/464,394, filed on Apr. 18, 2003.

(51) Int. Cl.
*G06F 11/30* (2006.01)
*G06F 12/14* (2006.01)
(52) U.S. Cl. .................. 713/190; 713/192; 713/181
(58) Field of Classification Search .............. 713/179, 713/180, 181, 190; 380/29
See application file for complete search history.

(56) References Cited

U.S. PATENT DOCUMENTS

| 4,168,396 A | 9/1979 | Best |
| 4,250,546 A | 2/1981 | Boney et al. |
| 4,275,265 A * | 6/1981 | Davida et al. .................. 380/29 |

(Continued)

FOREIGN PATENT DOCUMENTS

CN 1309351 A 8/2001

(Continued)

OTHER PUBLICATIONS

Goots, N. D et al. "Fast DDP-based Ciphers: from Hardware to Software." Circuits and Systems. 2003. MWSCAS '03. Proceedings of the 46th IEEE International Midwest Symposium on vol. 2, Dec. 27-30, 2003 pp. 770-773 vol. 2.

(Continued)

*Primary Examiner* — David García Cervetti
(74) *Attorney, Agent, or Firm* — Richard K. Huffman; James W. Huffman

(57) ABSTRACT

The present invention provides an apparatus and method for performing cryptographic operations on a plurality of message blocks within a processor to generate a message digest. In one embodiment, the apparatus has an x86-compatible microprocessor that includes translation logic and execution logic. The translation logic receives a single, atomic cryptographic instruction from a source therefrom, where the single, atomic cryptographic instruction prescribes generation of the message digest according to one of the cryptographic operations. The translation logic also translates the single, atomic cryptographic instruction into a sequence of micro instructions specifying sub-operations required to accomplish generation of the message digest according to the one of the cryptographic operations. The execution logic is operatively coupled to the translation logic. The execution logic receives the sequence of micro instructions, and performs the sub-operations to generate the message digest.

37 Claims, 10 Drawing Sheets

U.S. PATENT DOCUMENTS

| | | | |
|---|---|---|---|
| 4,278,837 A | 7/1981 | Best | |
| 4,316,055 A | 2/1982 | Feistel | |
| 4,319,079 A | 3/1982 | Best | |
| 4,386,234 A | 5/1983 | Ehrsam et al. | |
| 4,465,901 A | 8/1984 | Best | |
| 4,633,388 A | 12/1986 | Chiu | |
| 4,668,103 A * | 5/1987 | Wilson | 380/30 |
| 4,888,802 A | 12/1989 | Cooney | |
| 5,016,276 A | 5/1991 | Matumoto et al. | |
| 5,020,106 A * | 5/1991 | Rabold et al. | 713/160 |
| 5,103,478 A * | 4/1992 | Matyas et al. | 380/280 |
| 5,134,713 A | 7/1992 | Miller et al. | |
| 5,161,193 A * | 11/1992 | Lampson et al. | 713/151 |
| 5,218,637 A | 6/1993 | Angebaud et al. | |
| 5,265,164 A * | 11/1993 | Matyas et al. | 380/30 |
| 5,311,595 A * | 5/1994 | Bjerrum et al. | 713/169 |
| 5,384,846 A * | 1/1995 | Berson et al. | 713/186 |
| 5,388,158 A * | 2/1995 | Berson | 713/176 |
| 5,420,924 A * | 5/1995 | Berson et al. | 713/186 |
| 5,432,849 A * | 7/1995 | Johnson et al. | 380/280 |
| 5,613,005 A * | 3/1997 | Murakami et al. | 380/28 |
| 5,615,263 A * | 3/1997 | Takahashi | 713/164 |
| 5,633,934 A | 5/1997 | Hember | |
| 5,666,411 A | 9/1997 | McCarty | |
| 5,673,319 A | 9/1997 | Bellare et al. | |
| 5,828,873 A | 10/1998 | Lynch | |
| 5,864,622 A * | 1/1999 | Marcus | 713/186 |
| 5,870,470 A | 2/1999 | Johnson et al. | |
| RE36,310 E | 9/1999 | Bjerrum et al. | 713/168 |
| 6,006,328 A | 12/1999 | Drake | |
| 6,021,201 A * | 2/2000 | Bakhle et al. | 713/189 |
| 6,026,490 A | 2/2000 | Johns-Vano et al. | |
| 6,081,884 A | 6/2000 | Miller | |
| 6,088,800 A * | 7/2000 | Jones et al. | 713/189 |
| 6,101,255 A | 8/2000 | Harrison et al. | |
| 6,141,675 A * | 10/2000 | Slavenburg et al. | 708/706 |
| 6,182,216 B1 * | 1/2001 | Luyster | 713/168 |
| 6,202,077 B1 * | 3/2001 | Smith | 708/523 |
| 6,246,768 B1 | 6/2001 | Kim | |
| 6,269,163 B1 | 7/2001 | Rivest et al. | |
| 6,301,362 B1 | 10/2001 | Matyas, Jr. et al. | |
| 6,324,286 B1 | 11/2001 | Lai et al. | |
| 6,354,494 B1 * | 3/2002 | Marcus | 235/380 |
| 6,434,699 B1 * | 8/2002 | Jones et al. | 713/168 |
| 6,446,190 B1 * | 9/2002 | Barry et al. | 712/24 |
| 6,490,607 B1 * | 12/2002 | Oberman | 708/620 |
| 6,570,988 B1 * | 5/2003 | Venkatesan et al. | 380/28 |
| 6,578,150 B2 | 6/2003 | Luyster | |
| 6,598,165 B1 * | 7/2003 | Galasso | 713/189 |
| 6,674,874 B1 | 1/2004 | Yoshida et al. | |
| 6,694,430 B1 * | 2/2004 | Zegelin et al. | 713/160 |
| 6,778,667 B1 * | 8/2004 | Bakhle et al. | 380/37 |
| 6,789,147 B1 | 9/2004 | Kessler et al. | |
| 6,795,930 B1 | 9/2004 | Laurenti et al. | |
| 6,861,865 B1 * | 3/2005 | Carlson | 326/10 |
| 6,907,438 B1 * | 6/2005 | Horton et al. | 708/402 |
| 6,919,684 B2 | 7/2005 | Brandes | |
| 6,973,187 B2 * | 12/2005 | Gligor et al. | 380/28 |
| 6,973,469 B1 * | 12/2005 | Hsu et al. | 708/402 |
| 6,981,149 B1 * | 12/2005 | Housley et al. | 713/189 |
| 6,983,374 B2 | 1/2006 | Hashimoto et al. | |
| 7,054,445 B2 * | 5/2006 | Gligor et al. | 380/37 |
| 7,073,059 B2 | 7/2006 | Worely et al. | |
| 7,088,826 B2 | 8/2006 | Houlberg et al. | |
| 7,110,545 B2 | 9/2006 | Furuya et al. | |
| 7,124,302 B2 | 10/2006 | Ginter et al. | |
| 7,137,004 B2 * | 11/2006 | England et al. | 713/176 |
| 7,139,808 B2 * | 11/2006 | Anderson et al. | 709/212 |
| 7,184,549 B2 | 2/2007 | Sorimachi et al. | |
| 7,194,090 B2 | 3/2007 | Muratani et al. | |
| 7,205,785 B1 * | 4/2007 | Carlson | 326/8 |
| 7,221,763 B2 * | 5/2007 | Verbauwhede | 380/277 |
| 7,242,414 B1 * | 7/2007 | Thekkath et al. | 345/623 |
| 7,337,314 B2 * | 2/2008 | Hussain et al. | 713/151 |
| 7,400,722 B2 * | 7/2008 | Qi et al. | 380/28 |
| 7,451,294 B2 * | 11/2008 | Sperber et al. | 712/216 |
| 7,631,025 B2 * | 12/2009 | Debes et al. | 708/209 |
| 2001/0033656 A1 * | 10/2001 | Gligor et al. | 380/28 |
| 2001/0037450 A1 | 11/2001 | Metlitski et al. | |
| 2001/0046292 A1 * | 11/2001 | Gligor et al. | 380/37 |
| 2001/0050989 A1 | 12/2001 | Zakiya | |
| 2002/0031220 A1 * | 3/2002 | Lee et al. | 380/37 |
| 2002/0048364 A1 * | 4/2002 | Gligor et al. | 380/37 |
| 2002/0101985 A1 | 8/2002 | Calvignac et al. | |
| 2002/0110239 A1 * | 8/2002 | Venkatesan et al. | 380/28 |
| 2002/0162026 A1 | 10/2002 | Neuman et al. | |
| 2002/0191784 A1 | 12/2002 | Yup et al. | |
| 2003/0039354 A1 | 2/2003 | Kimble et al. | |
| 2003/0097579 A1 * | 5/2003 | England et al. | 713/193 |
| 2003/0149863 A1 * | 8/2003 | Henry et al. | 712/225 |
| 2003/0185391 A1 * | 10/2003 | Qi et al. | 380/44 |
| 2003/0202658 A1 * | 10/2003 | Verbauwhede | 380/43 |
| 2003/0223580 A1 | 12/2003 | Snell | |
| 2004/0047466 A1 * | 3/2004 | Feldman et al. | 380/37 |
| 2004/0054877 A1 * | 3/2004 | Macy et al. | 712/221 |
| 2004/0054878 A1 * | 3/2004 | Debes et al. | 712/221 |
| 2004/0054879 A1 * | 3/2004 | Macy et al. | 712/221 |
| 2004/0103263 A1 | 5/2004 | Colavin et al. | |
| 2004/0139415 A1 * | 7/2004 | Hamlin | 716/16 |
| 2004/0202319 A1 * | 10/2004 | Hussain et al. | 380/33 |
| 2004/0205331 A1 * | 10/2004 | Hussain et al. | 713/153 |
| 2005/0060558 A1 * | 3/2005 | Hussain et al. | 713/189 |
| 2005/0084076 A1 | 4/2005 | Dhir et al. | |
| 2006/0056623 A1 * | 3/2006 | Gligor et al. | 380/28 |
| 2007/0152058 A1 * | 7/2007 | Yeakley et al. | 235/462.01 |
| 2008/0031454 A1 * | 2/2008 | Verbauwhede | 380/277 |

FOREIGN PATENT DOCUMENTS

| | | |
|---|---|---|
| CN | 1431584 A | 7/2003 |
| DE | 3432721 A1 | 3/1986 |
| EP | 0913767 A2 | 5/1999 |
| EP | 1202150 A2 | 5/2002 |
| EP | 1215842 | 6/2002 |
| EP | 1271839 | 1/2003 |
| EP | 1298518 A2 | 4/2003 |
| EP | 1351432 A | 10/2003 |
| JP | 57176457 | 10/1982 |
| TW | 575816 | 2/2004 |
| TW | 578096 | 3/2004 |
| TW | I225355 | 12/2004 |
| WO | WO0076119 A1 | 12/2000 |
| WO | WO0117152 | 3/2001 |
| WO | WO0144900 A2 | 6/2001 |
| WO | WO0184769 A | 11/2001 |
| WO | WO03036508 | 5/2003 |

OTHER PUBLICATIONS

Suwartadi, E. et al. "First Step Toward Internet Based Embedded Control System." Control Conference, 2004. 5th Asian. vol. 2, Jul. 20-23, 2004, pp. 1226-1231.

Michalsi, A. et al. "High-throughput Reconfigurable Computing: Deisgn and Implementation of an IDEA Encryption Cryptosystem on the SRC-6E Reconfigurable Computer." Field Programmable Logic and Applications, 2005. International Conference on Aug. 24-26, 2005 pp. 681-686.

Schneier. "Applied Cryptography, Protocols, Algorithms and Source Code in C." 2nd edition 2.3 One Way Funtions Applied Cryptography. Oct. 18, 1995. pp. 29-31, 193. XP002224472.

Rechenberg et al. "Informatik-Handbuch" Informatik-Handbuch, 2002, XP0023666659. p. 304-p. 324.

Institute for Applied Information Processing and Communications, Tu Graz: "Cryptographic Logic Unit /Crypto Unit Macrocel Webpages. " Cryptographic Reduced Instruction Set Processor Smartcard, online Apr. 12, 2000. XP00236660 Retrieved from the Internet: URL: http://web.archive.org/web/20000412010535 http://www.iaik.tu-graz.ac.at/Research/VLSI/CRISP/crisp.htm retrieved on Feb. 7, 2006 !page 8.

"Secure Microcontrollers for Smart Cards. AT90SC Summary" Announcement Atmel, 1999, pp. 1-7. XP002291271.

Ulmann, B. "Designing a NICE Processor." Microprocessors and Microsystems, IPC Business Press Ltd. London, GB. vol. 23, No. 5. Oct. 25, 1999. pp. 257-264. XP004321479 ISSN: 0141-9331.

Dimond et al. "Application-specific Customisation of Multi-Threaded Soft Processors." Computers and Digital Techniques. IEEE Proceedings. vol.153, Issue 3. May 2, 2006. pp. 173-180.

Anderson et at. "Cryptographic Processors - A Survey." Proceedings of the IEEE. vol. 94, Issue 2. Feb. 2006. pp. 357-369.

Eberle et al. "Architectural Extensions for Elliptic Curve Cryptography over $GF(2^m)$ on 8-bit Microprocessors." Application-Specific Systems. Architecture Processors. 2005. ASAP 2005. 16th IEEE International Conference on Jul. 23-25, 2005. pp. 343-349.

Kuhn, Markus G. "Cipher Instruction Search Attack on the Bus-Encryption Security Microcontroller DS5002FP." Computers, IEEE Transactions on vol. 47, Issue 10. Oct. 1998. pp. 1153-1157.

Fischer et al. "Two Methods of Rijndael Implementation in Reconfigurable Hardware." Springer-verlag Berlin Heidelberg 2001. CHES 2001. LNCS 2162. pp. 77-92.

"IBM PCI Cryptographic Coprocessor CCA Basic Services Reference and Guide for IBM 4758 Models 002 and 023 with Release 2.40," IBM, Sep. 2001, XP002291430.

Kim, Ho Won et el. "Design and Implementation of a Private and Public Key Crypto Porcessor and Its Application to a Security System." IEEE Transactions on Consumer Electronics. vol. 50, No. 1, Feb. 2004. pp. 214-224.

Wu et al. "CryptoManiac: a fast flexible architecture for secure communication." Proceedings of the 28th. International Symposium on Computer Architecture. ISCA 2001. Jun. 30, 2001 pp. 104-113, XP010553867.

Gladman, Brian. "A Specification for Rijndael, the AES Algorithm." Online. Mar. 13, 2003. XP002376287.

Backhus E. "AES in FPGAS Implementierung Des Advanced Encryption Standards in Hardware." Elektronik, WEKA Fachzeitschriftenverlag, Poing, DE. vol. 52, No. 8. Apr. 15, 2003 pp. 54-56, 58, 60. XP001160048.

Daemon J et al. "AES Proposal: Rijn Dael." AES Proposal Sep. 3, 1999. pp. 1-45, XP001060386.

Tong et al. "A system level implementation of Rijndael on a memory-slot based FPGA card." Field-Programmable Technology, 2002. (FPT). Dec. 16, 2002, pp. 102-109, XP010636515 ISBN: 0-7803-7574-2.

Taylor D E et al. "Dynamic Hardware Plugins: Exploiting Reconfigurable Hardware for High-Performance Programmable Routers." Computer Networks, Elsevier Science Publishers B.V., Amsterdam, NL, vol. 38, No. 3. Feb. 21, 2002 pp. 295-310. XP004333786. ISSN: 1389-1286.

Elbirt A J et al. "Instruction-Level Distributed Processing for Symmetric-Key Cryptography." Parallel and Distributed Processing Symposium. 2003. Apr. 22, 2003. pp. 78-87. XP010645610 ISBN: 0-7695-1926-1.

McKinnon at al. "A Configurable Middleware Framework with Multiple Quality of Service Properties for Small Embedded Systems." Network Computing and Applications, 2003. NCA 2003. Second IEEE International Symposium on Apr. 16-18, 2003, Piscataway, NJ, USA IEEE, Apr. 16, 2003. pp. 197-204, XP010640251 ISBN: 0-7695-1938-5.

Lee et al. "Efficient Permutation Instructions for Fast Software Cryptography." IEEE Micro, Nov. 2001. pp. 56-69.

Schneier: "Applied Cryptography." 1996. John Wiley & Sons, New York, US. XP002341498. pp. 30-31, pp. 189- 211, pp. 446-459.

* cited by examiner

FIG. 4

| OPTIONAL PREFIX | REPEAT PREFIX | X FUNCTION OPCODE | BLOCK CIPHER MODE |
|---|---|---|---|
| 401 | 402 | 403 | 404 |

| BCM VALUE | MODE |
|---|---|
| 0xC8 | ELECTRONIC CODE BOOK (ECB) |
| 0xD0 | CIPHER BLOCK CHAINING (CBC) |
| 0xD8 | COUNTER (CTR) |
| 0xE0 | CIPHER FEEDBACK (CFB) |
| 0xE8 | OUTPUT FEEDBACK (OFB) |
| ALL OTHER VALUES | RESERVED |

| MICRO OPCODE | DATAREG | REGISTER |
|---|---|---|
| ←—14 BITS—→ | ←—5 BITS—→ | ←3 BITS→ |

| VALUE | OPERATION |
|---|---|
| 000 | RESERVED |
| 001 | RESERVED |
| 010 | LOAD CONTROL WORD (CW) REGISTER |
| 011 | RESERVED |
| 100 | LOAD INPUT-0 (IN-0) REGISTER AND START CRYPTOGRAPHY UNIT |
| 101 | LOAD INPUT-1 (IN-1) REGISTER |
| 110 | LOAD CRYPTO KEY-0 REGISTER (LOWER 128 BITS OF KEY) |
| 111 | LOAD CRYPTO KEY-1 REGISTER (UPPER 128 BITS OF KEY) |

| VALUE | OPERATION |
|---|---|
| 000 | RESERVED |
| 001 | RESERVED |
| 010 | RESERVED |
| 011 | RESERVED |
| 100 | STORE OUTPUT-0 (OUT-0) REGISTER |
| 101 | STORE OUTPUT-1 (OUT-1) REGISTER |
| 110 | RESERVED |
| 111 | RESERVED |

APPARATUS AND METHOD FOR EMPLOYING CRYPTOGRAPHIC FUNCTIONS TO GENERATE A MESSAGE DIGEST

CROSS-REFERENCE TO RELATED APPLICATIONS

This application claims the benefit of the following U.S. Provisional Applications, each of which is herein incorporated by reference for all intents and purposes.

| SER. NO. | FILING DATE | TITLE |
| --- | --- | --- |
| 60/556093 (CNTR.2235) | Mar. 25, 2004 | APPARATUS AND METHOD FOR EMPLOYING CYRPTOGRAPHIC FUNCTIONS TO GENERATE A MESSAGE DIGEST |
| 60/571122 (CNTR.2239) | May 14, 2004 | APPARATUS AND METHOD FOR EMPLOYING CYRPTOGRAPHIC FUNCTIONS TO GENERATE A MESSAGE DIGEST |
| 60/582422 (CNTR.2253) | Jun. 24, 2004 | SECURITY APPLICATION NOTE |

This application is a continuation-in-part of the following U.S. patent application, which is herein incorporated by reference for all intents and purposes.

| SER. NO. | FILING DATE | TITLE |
| --- | --- | --- |
| 10/674057 (CNTR.2224), now U.S. Pat. No. 7,321,910 | Sep. 29, 2003 | MICROPROCESSOR APPARATUS AND METHOD FOR PERFORMING BLOCK CIPHER CRYPTOGRAPHIC FUNCTIONS |

The aforementioned U.S. Patent Application claims the benefit of U.S. Provisional Application Ser. No. 60/464,394, filed on Apr. 18, 2003.

This application is related to the following co-pending U.S. patent applications, each of which has a common assignee and common inventors.

| SER. NO. | FILING DATE | TITLE |
| --- | --- | --- |
| 10/800768 (CNTR.2070), now U.S. Pat. No. 7,392,400 | Mar. 15, 2004 | MICROPROCESSOR APPARATUS AND METHOD FOR OPTIMIZING BLOCK CIPHER CRYPTOGRAPHIC FUNCTIONS |
| 10/727973 (CNTR.2071) | Dec. 4, 2003 | APPARATUS AND METHOD FOR PERFORMING TRANSPARENT BLOCK CIPHER CRYPTOGRAPHIC FUNCTIONS |
| 10/800938 (CNTR.2072) | Mar. 15, 2004 | MICROPROCESSOR APPARATUS AND METHOD FOR EMPLOYING CONFIGURABLE BLOCK CIPHER CRYPTOGRAPHIC ALGORITHMS |
| 10/800983 (CNTR.2073) | Mar. 15, 2004 | APPARATUS AND METHOD FOR PROVIDING USER-GENERATED KEY SCHEDULE IN A MICROPROCESSOR CRYPTOGRAPHIC ENGINE |
| 10/826435 (CNTR.2075) | Apr. 16, 2004 | MICROPROCESSOR APPARATUS AND METHOD FOR PROVIDING CONFIGURABLE CRYPTOGRAPHIC BLOCK CIPHER ROUND RESULTS |
| 10/826433 (CNTR.2076) | Apr. 16, 2004 | MICROPROCESSOR APPARATUS AND METHOD FOR ENABLING CONFIGURABLE DATA BLOCK SIZE IN A CRYPTOGRAPHIC ENGINE |
| 10/826475 (CNTR.2223) | Apr. 16, 2004 | MICROPROCESSOR APPARATUS AND METHOD FOR PROVIDING CONFIGURABLE CRYPTOGRAPHIC KEY SIZE |
| 10/730167 (CNTR.2224-C1) | Dec. 5, 2003 | MICROPROCESSOR APPARATUS AND METHOD FOR PERFORMING BLOCK CIPHER CRYPTOGRAPHIC FUNCTIONS |
| 10/826814 (CNTR.2226) | Apr. 16, 2004 | APPARATUS AND METHOD FOR PERFORMING TRANSPARENT CIPHER BLOCK CHAINING MODE CRYPTOGRAPHIC FUNCTIONS |
| 10/826428 (CNTR.2227) | Apr. 16, 2004 | APPARATUS AND METHOD FOR PERFORMING TRANSPARENT CIPHER FEEDBACK MODE CRYPTOGRAPHIC FUNCTIONS |
| 10/826745 (CNTR.2228) | Apr. 16, 2004 | APPARATUS AND METHOD FOR PERFORMING TRANSPARENT OUTPUT FEEDBACK MODE CRYPTOGRAPIC FUNCTIONS |
| 10/826632 (CNTR.2230) | Apr. 16, 2004 | APPARATUS AND METHOD FOR GENERATING A CRYPTOGRAPHIC KEY SCHEDULE IN A MICROPROCESSOR |

BACKGROUND OF THE INVENTION

This invention relates in general to the field of microelectronics, and more particularly to an apparatus and method in a microprocessor or other device for generating message digests, where the message digests are generated according to cryptographic algorithms that employ block cipher modes.

DESCRIPTION OF THE RELATED ART

An early computer system operated independently of other computer systems in the sense that all of the input data required by an application program executing on the early computer system was either resident on that computer system or was provided by an application programmer at run time. The application program generated output data as a result of being executed and the output data was generally in the form of a paper printout or a file which was written to a magnetic tape drive, disk drive, or other type of mass storage device that was part of the computer system. The output file could then be used as an input file to a subsequent application program that was executed on the same computer system or, if the output data was previously stored as a file to a removable or transportable mass storage device, it could then be provided to a different, yet compatible, computer system to be employed by application programs thereon. On these early systems, the need for protecting sensitive information was recognized and, among other information security measures, cryptographic application programs were developed and employed to protect the sensitive information from unauthorized disclosure. These cryptographic programs typically scrambled and unscrambled the output data that was stored as files on mass storage devices.

It was not many years thereafter before users began to discover the benefits of networking computers together to provide shared access to information. Consequently, network architectures, operating systems, and data transmission protocols commensurately evolved to the extent that the ability to access shared data was not only supported, but prominently featured. For example, it is commonplace today for a user of a computer workstation to access files on a different workstation or network file server, or to utilize the Internet to obtain news and other information, or to transmit and receive electronic messages (i.e., email) to and from hundreds of other computers, or to connect with a vendor's computer system and to provide credit card or banking information in order to purchase products from that vendor, or to utilize a wireless network at a restaurant, airport, or other public setting to perform any of the aforementioned activities. Therefore, the need to protect sensitive data and transmissions from unauthorized disclosure has grown dramatically. The number of instances during a given computer session where a user is obliged to protect his or her sensitive data has substantially increased. Current news headlines regularly force computer information security issues such as spam, hacking, identity theft, reverse engineering, spoofing, and credit card fraud to the forefront of public concern. And since the motivation for these invasions of privacy range all the way from innocent mistakes to premeditated cyber terrorism, responsible agencies have responded with new laws, stringent enforcement, and public education programs. Yet, none of these responses has proved to be effective at stemming the tide of computer information compromise. Consequently, what was once the exclusive concern of governments, financial institutions, the military, and spies has now become a significant issue for the average citizen who reads their email or accesses their checking account transactions from their home computer. On the business front, one skilled in the art will appreciate that corporations from small to large presently devote a remarkable portion of their resources to the protection of proprietary information.

The field of information security that provides us with techniques and means to encode data so that it can only be decoded by specified individuals is known as cryptography. When particularly applied to protecting information that is stored on or transmitted between computers, cryptography most often is utilized to transform sensitive information (known in the art as "plaintext" or "cleartext") into an unintelligible form (known in the art as "ciphertext"). The transformation process of converting plaintext into ciphertext is called "encryption," "enciphering," or "ciphering" and the reverse transformation process of converting ciphertext back into plaintext is referred to as "decryption," "deciphering," or "inverse ciphering."

Within the field of cryptography, several procedures and protocols have been developed that allow for users to perform cryptographic operations without requiring great knowledge or effort and for those users to be able to transmit or otherwise provide their information products in encrypted forms to different users. Along with encrypted information, a sending user typically provides a recipient user with a "cryptographic key" that enables the recipient user to decipher the encrypted information thus enabling the recipient user to recover or otherwise gain access to the unencrypted original information. One skilled in the art will appreciate that these procedures and protocols generally take the form of password protection, mathematical algorithms, and application programs specifically designed to encrypt and decrypt sensitive information.

Several classes of algorithms are currently used to encrypt and decrypt data. Algorithms according to one such class (i.e., public key cryptographic algorithms, an instance of which is the RSA algorithm) employ two cryptographic keys, a public key and a private key, to encrypt or decrypt data. According to some of the public key algorithms, a recipient's public key is employed by a sender to encrypt data for transmission to the recipient. Because there is a mathematical relationship between a user's public and private keys, the recipient must employ his private key to decrypt the transmission in order to recover the data. Although this class of cryptographic algorithms enjoys widespread use today, encryption and decryption operations are exceedingly slow even on small amounts of data. A second class of algorithms, known as symmetric key algorithms, provide commensurate levels of data security and can be executed much faster. These algorithms are called symmetric key algorithms because they use a single cryptographic key to both encrypt and decrypt information. In the public sector, there are currently three prevailing single-key cryptographic algorithms: the Data Encryption Standard (DES), Triple DES, and the Advanced Encryption Standard (AES). Because of the strength of these algorithms to protect sensitive data, they are used now by U.S. Government agencies, but it is anticipated by those in the art that one or more of these algorithms will become the standard for commercial and private transactions in the near future. According to all of these symmetric key algorithms, plaintext and ciphertext is divided into blocks of a specified size for encryption and decryption. For example, AES performs cryptographic operations on blocks 128 bits in size, and uses cryptographic key sizes of 128-, 192-, and 256-bits. Other symmetric key algorithms such as the Rijndael Cipher allow for 192-and 256-bit data blocks as well. Accordingly, for a block encryption operation, a 1024-bit plaintext message is encrypted as eight 128-bit blocks.

All of the symmetric key algorithms utilize the same type of sub-operations to encrypt a block of plaintext. And according to many of the more commonly employed symmetric key algorithms, an initial cryptographic key is expanded into a plurality of keys (i.e., a "key schedule"), each of which is employed as a corresponding cryptographic "round" of sub-operations is performed on the block of plaintext. For instance, a first key from the key schedule is used to perform a first cryptographic round of sub-operations on the block of plaintext. The result of the first round is used as input to a second round, where the second round employs a second key from the key schedule to produce a second result. And a specified number of subsequent rounds are performed to yield a final round result which is the ciphertext itself. According to the AES algorithm, the sub-operations within each round are referred to in the literature as SubBytes (or S-box), ShiftRows, MixColums, and AddRoundKey. Decryption of a block of ciphertext is similarly accomplished with the exceptions that the ciphertext is the input to the inverse cipher and inverse sub-operations are performed (e.g., Inverse MixColumns, Inverse ShiftRows) during each of the rounds, and the final result of the rounds is a block of plaintext.

DES and Triple-DES utilize different specific sub-operations, but the sub-operations are analogous to those of AES because they are employed in a similar fashion to transform a block of plaintext into a block of ciphertext.

To perform cryptographic operations on multiple successive blocks of text, all of the symmetric key algorithms employ the same types of modes. These modes include electronic code book (ECB) mode, cipher block chaining (CBC) mode, counter mode (CTR), cipher feedback (CFB) mode, and output feedback (OFB) mode. Some of these modes utilize an additional initialization vector during performance of the sub-operations and some use the ciphertext output of a first set of cryptographic rounds performed on a first block of plaintext as an additional input to a second set of cryptographic rounds performed on a second block of plaintext. It is beyond the scope of the present application to provide an in depth discussion of each of the cryptographic algorithms and sub-operations employed by present day symmetric key cryptographic algorithms. For specific implementation standards, the reader is directed to *Federal Information Processing Standards Publication* 46-3 (FIPS-46-3), dated Oct. 25, 1999 for a detailed discussion of DES and Triple DES, and *Federal Information Processing Standards Publication* 197 (FIPS-197), dated Nov. 26, 2001 for a detailed discussion of AES. Both of the aforementioned standards are issued and maintained by the National Institute of Standards and Technology (NIST) and are herein incorporated by reference for all intents and purposes. In addition to the aforementioned standards, tutorials, white papers, toolkits, and resource articles can be obtained from NIST's Computer Security Resource Center (CSRC) over the Internet at http://csrc.nist.gov/.

In addition to encryption and decryption of information, another type of information security measure is now widely employed as a means to verify the contents of a given string of data, or a file, or of many files stored on, say, a hard disk drive, magnetic tape, or other storage device. This verification measure is commonly known as a message digest, and the application programs that perform the functions to generate the message digest go by the names of one-way hash functions, hash functions, compression applications, contraction functions, fingerprints, cryptographic checksums, message integrity checksums, and manipulation detection code. By whatever name, these applications typically take a variable length input string called a message or pre-image, and convert it to a fixed-length and generally smaller size output string called a hash or message digest. For example, consider sending a file to a someone else over the Internet. If that file contains financial, contractual, legal, or any other type of data that is important for both sender and receiver to know with high probability that it hasn't been tampered with, then the sender would perform a hash of the file and would send the message digest to the recipient along with the file itself. If the file has been changed in any way during transmission, when the recipient performs the same hash (i.e., executes the same hash function as the sender performed) of the file upon receipt, then the message digest generated upon receipt will not match that which was sent and thus, it is known that the contents of the file have changed since they were sent. Of course, it is possible for the file to be attacked in such a manner as to change both the message and the hash so that the altered hash matches the altered message. In such a case, the attack would be successful. This is why information security protocols utilize, in addition to message digest generation functions, other techniques as noted above to protect information such as encryption, secure authentication, and the like.

With the advent of computer networks and more advanced data transmission protocols, the probability for unauthorized access of sensitive files has dramatically increased. In fact, today's network architectures, operating systems, and data transmission protocols have evolved to the extent that the ability to access shared data is not only supported, but is prominently featured. For example, it is commonplace today for a user of a computer workstation to access files on a different workstation or network file server, or to utilize the Internet to obtain news and other information, or to transmit and receive electronic messages (i.e., email) to and from hundreds of other computers, or to connect with a vendor's computer system and to provide credit card or banking information in order to purchase products from that vendor, or to utilize a wireless network at a restaurant, airport, or other public setting to perform any of the aforementioned activities. Therefore, the need to protect sensitive data and transmissions from unauthorized tampering has grown dramatically. The number of instances during a given computer session where a user is obliged to validate or verify his or her sensitive data has substantially increased. Current news headlines regularly bring computer information security issues such as spam, spyware, adware, hacking, identity theft, spoofing, and credit card fraud to the forefront of public concern. And since the motivation for these invasions of privacy range all the way from innocent mistakes to premeditated cyber terrorism, responsible agencies have responded with new laws, stringent enforcement, and public education programs. Yet, none of these responses has proved to be effective at stemming the tide of computer information compromise. Consequently, what was once the exclusive concern of governments, financial institutions, the military, and spies has now become a significant issue for the average citizen who reads their email or accesses their checking account transactions from their home computer. On the business front, one skilled in the art will appreciate that corporations from small to large presently devote a remarkable portion of their resources to the validation and verification of proprietary information.

Within the field of cryptography, several procedures and protocols have been developed that allow for users to perform hash operations without requiring great knowledge or effort and for those users to be able to transmit or otherwise provide their information products in along with a corresponding message digest to different users. One skilled in the art will appreciate that these procedures and protocols generally take the form mathematical algorithms which application programs specifically implement to accomplish a hash of sensitive information.

Several algorithms are currently used to perform digital hash functions. These include, but are not limited to, the Secure Hash Algorithm (SHA), N-Hash, Snerfu, MD2, MD4, MD5, Ripe-MD, Haval, and the like. But the present inventors have particularly observed that there is an increased interest and need in the art to provide one-way hash functions that employ symmetric key algorithms such as the Advanced Encryption Standard (AES) noted above as its hash function. For example, encrypting plaintext consisting of 1024 bits using 128-bit blocks according a AES cipher block chaining (CBC) mode results in a 1024-bit output of ciphertext. When employed as a hash algorithm, all but the last block of processed data is discarded. Hence, a hash performed on the same 1024 bits noted above using the 128-bit block AES encryption algorithm according to CBC mode results in a message digest of 128 bits. One skilled will appreciate that if a message digest is generated on one end using a symmetric key encryption algorithm, then the encryption algorithm must be employed as well by the receiving end to validate the transmitted message. One skilled will also appreciate that a decryption algorithm can be employed as well on both transmitting and receiving ends to generate and validate a message digest for a given message. And since a message digest is generated using a symmetric key algorithm by encrypting (or decrypting) a message and discarding all but the final encrypted (or decrypted) block, to produce a meaningful hash, the block cipher mode that is employed to perform the hash function must be one of the modes that feeds forward the result of a previously computed intermediate hash on a block of data into the hash function that is performed on the next block of data. Accordingly, a message (i.e., "input text") is divided into blocks of a specified size according to the symmetric key algorithm selected for the hash function. For example, an AES hash may be performed on message blocks which are 128 bits, 192 bits, or 256 bits in size, and the message digest that is generated is 128 bits, 192 bits, or 256 bits in size, respectively. An intermediate hash value is generated after performing the hash function on each message block and the intermediate hash value is fed forward in accordance with the block cipher mode employed for performance of the hash function on the next message block. The value of the hash following processing of the last message block is the message digest.

One skilled in the art will appreciate that there are numerous application programs available for execution on a computer system that can perform cryptographic operations (i.e., encryption, decryption, message digest). In fact, some operating systems (e.g. Microsoft® WindowsXP®, Linux) provide direct services in the form of cryptographic primitives, cryptographic application program interfaces, and the like. The present inventors, however, have observed that present day computer cryptography techniques are deficient in several respects. Thus, the reader's attention is directed to FIG. 1, whereby these deficiencies are highlighted and discussed below.

FIG. 1 is a block diagram 100 illustrating present day computer cryptography applications. The block diagram 100 depicts a first computer workstation 101 connected to a local area network 105. Also connected to the network 105 is a second computer workstation 102, a network file storage device 106, a first router 107 or other form of interface to a wide area network (WAN) 110 such as the Internet, and a wireless network router 108 such as one of those compliant with IEEE Standard 802.11. A laptop computer 104 interfaces to the wireless router 108 over a wireless network 109. At another point on the wide area network 110, a second router 111 provides interface for a third computer workstation 103.

As alluded to above, a present day user is confronted with the issue of computer information security many times during a work session. For example, under the control of a present day multi-tasking operating system, a user of workstation 101 can be performing several simultaneous tasks, each of which require cryptographic operations. The user of workstation 101 is required to run an encryption/decryption or hash application 112 (either provided as part of the operating system or invoked by the operating system) to store a local file on the network file storage device 106. Concurrent with the file storage, the user can transmit an encrypted message with or without a message digest to a second user at workstation 102, which also requires executing an instance of the encryption/decryption or hash application 112. The encrypted message may be real-time (e.g., an instant message) or non-real-time (i.e. email). In addition, the user can be accessing or providing his/her financial data (e.g., credit card numbers, financial transactions, etc.) or other forms of sensitive data over the WAN 110 from workstation 103. Workstation 103 could also represent a home office or other remote computer 103 that the user of workstation 101 employs when out of the office to access any of the shared resources 101, 102, 106 107, 108, 109 on local area network 105. Each of these aforementioned activities requires that a corresponding instance of the encryption/decryption or hash application 112 be invoked. Furthermore, wireless networks 109 are now being routinely provided in coffee shops, airports, schools, and other public venues, thus prompting a need for a user of laptop 104 to encrypt/decrypt/hash not only his/her messages to/from other users, but to encrypt/decrypt/hash all communications over the wireless network 109 to the wireless router 108.

One skilled in the art will therefore appreciate that along with each activity that requires cryptographic operations at a given workstation 101-104, there is a corresponding requirement to invoke an instance of the encryption/decryption/hash application 112. Hence, a computer 101-104 in the near future could potentially be performing hundreds of concurrent cryptographic operations.

The present inventors have noted several limitations to the above approach of performing cryptographic operations by invoking one or more instances of an encryption/decryption/hash application 112 on a computing system 101-104. For example, performing a prescribed function via programmed software is exceedingly slow compared to performing that same function via dedicated hardware. Each time the encryption/decryption/hash application 112 is required, a current task executing on a computer 101-104 must be suspended from execution, and parameters of the cryptographic operation (i.e., plaintext, ciphertext, message block, intermediate hash value, block cipher mode, cryptographic key, etc.) must be passed through the operating system to the instance of the encryption/decryption/hash application 112, which is invoked for accomplishment of the cryptographic operation. And because cryptographic algorithms necessarily involve many rounds of sub-operations on a particular block of data, execution of the encryption/decryption/hash applications 112 involves the execution of numerous computer instructions to the extent that overall system processing speed is disadvantageously affected. One skilled in the art will appreciate that sending a small encrypted email message in Microsoft® Outlook® can take up to five times as long as sending an unencrypted email message.

In addition, current techniques are limited because of the delays associated with operating system intervention. Most application programs do not provide integral key generation or encryption/decryption/hash components; they employ components of the operating system or plug-in applications to accomplish these tasks. And operating systems are otherwise distracted by interrupts and the demands of other currently executing application programs.

Furthermore, the present inventors have noted that the accomplishment of cryptographic operations on a present day computer system 101-104 is very much analogous to the accomplishment of floating point mathematical operations prior to the advent of dedicated floating point units within microprocessors. Early floating point operations were performed via software and hence, they executed very slowly. Like floating point operations, cryptographic operations performed via software are disagreeably slow. As floating point technology evolved further, floating point instructions were provided for execution on floating point co-processors. These floating point co-processors executed floating point operations much faster than software implementations, yet they added cost to a system. Likewise, cryptographic co-processors exist today in the form of add-on boards or external devices that interface to a host processor via parallel ports or other interface buses (e.g., USB). These co-processors certainly enable the accomplishment of cryptographic operations much faster than pure software implementations. But cryptographic co-processors add cost to a system configuration, require extra power, and decrease the overall reliability of a system. Cryptographic co-processor implementations are additionally vulnerable to snooping because the data channel is not on the same die as the host microprocessor.

Therefore, the present inventors recognize a need for dedicated cryptographic hardware within a present day microprocessor such that an application program that requires a cryptographic operation can direct the microprocessor to perform the cryptographic operation via a single, atomic, cryptographic instruction. The present inventors also recognize that such a capability should be provided so as to limit requirements for operating system intervention and management. Also, it is desirable that the cryptographic instruction be available for use at an application program's privilege level and that the dedicated cryptographic hardware comport with prevailing architectures of present day microprocessors. There is also a need to provide the cryptographic hardware and associated cryptographic instruction in a manner that supports compatibility with legacy operating systems and applications. It is moreover desirable to provide an apparatus and method for performing cryptographic operations that are resistant to unauthorized observation, that can support multiple cryptographic algorithms, that support verification and testing of the particular cryptographic algorithm that is embodied thereon, that allow for user-provided keys as well as self-generated keys, that support multiple data block sizes and key sizes, that provide for programmable block cipher modes such as ECB, CBC, CTR, CFB, and OFB, and that the execution of block cipher cryptographic functions that employ any of the aforementioned programmable block cipher modes be efficiently performed across multiple data blocks.

SUMMARY OF THE INVENTION

The present invention, among other applications, is directed to solving these and other problems and disadvantages of the prior art. The present invention provides a superior technique for performing cryptographic operations within a microprocessor. In one embodiment, an apparatus is provided for accomplishing cryptographic operations. The apparatus has an x86-compatible microprocessor that includes translation logic and execution logic. The translation logic receives a single, atomic cryptographic instruction from a source therefrom, where the single, atomic cryptographic instruction prescribes generation of a message digest according to one of the cryptographic operations. The translation logic also translates the single, atomic cryptographic instruction into a sequence of micro instructions specifying sub-operations required to accomplish generation of the message digest according to the one of the cryptographic operations. The execution logic is operatively coupled to the translation logic. The execution logic receives the sequence of micro instructions, and performs the sub-operations to generate the message digest.

One aspect of the present invention contemplates a apparatus for performing cryptographic operations. The apparatus has a single, atomic cryptographic instruction and execution logic. The single, atomic cryptographic instruction is received by logic within an x876-compatible microprocessor, where the single, atomic cryptographic instruction prescribes generation of a message digest according to one of the cryptographic operations. The execution logic is coupled to the logic and is configured to perform the one of the cryptographic operations to generate the message digest.

Another aspect of the present invention comprises a method for performing cryptographic operations in a device. The method includes fetching a single, atomic cryptographic instruction for execution by an x86-compatible microprocessor, where the single, atomic cryptographic instruction prescribes generation of a message digest according to one of the cryptographic operations; and via a cryptography unit within the x86-compatible microprocessor, generating the message digest by executing the one of the cryptographic operations.

BRIEF DESCRIPTION OF THE DRAWINGS

These and other objects, features, and advantages of the present invention will become better understood with regard to the following description, and accompanying drawings where:

FIG. 4 is a block diagram showing one embodiment of an atomic cryptographic instruction according to the present invention;

FIG. 5 is a table illustrating exemplary block cipher mode field values according to the atomic cryptographic instruction of FIG. 4;

FIG. 7 is a diagram illustrating fields within an exemplary micro instruction for directing cryptographic sub-operations within the microprocessor of FIG. 6;

FIG. 8 is a table depicting values of the register field for an XLOAD micro instruction according to the format of FIG. 7;

FIG. 9 is a table showing values of the register field for an XSTOR micro instruction according to the format of FIG. 7;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
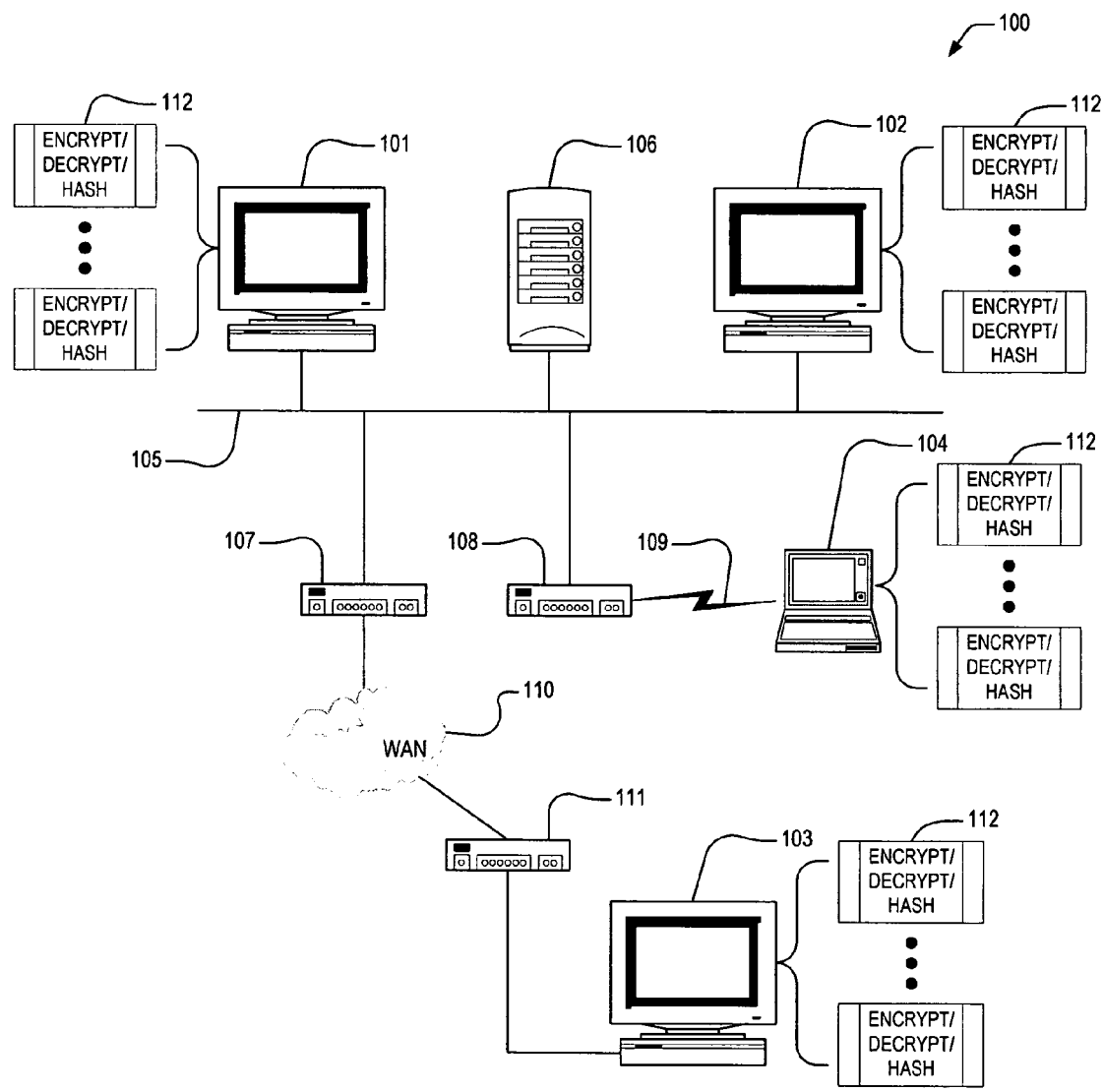
FIG. 1 is a block diagram illustrating present day cryptography applications.
Figure 2:
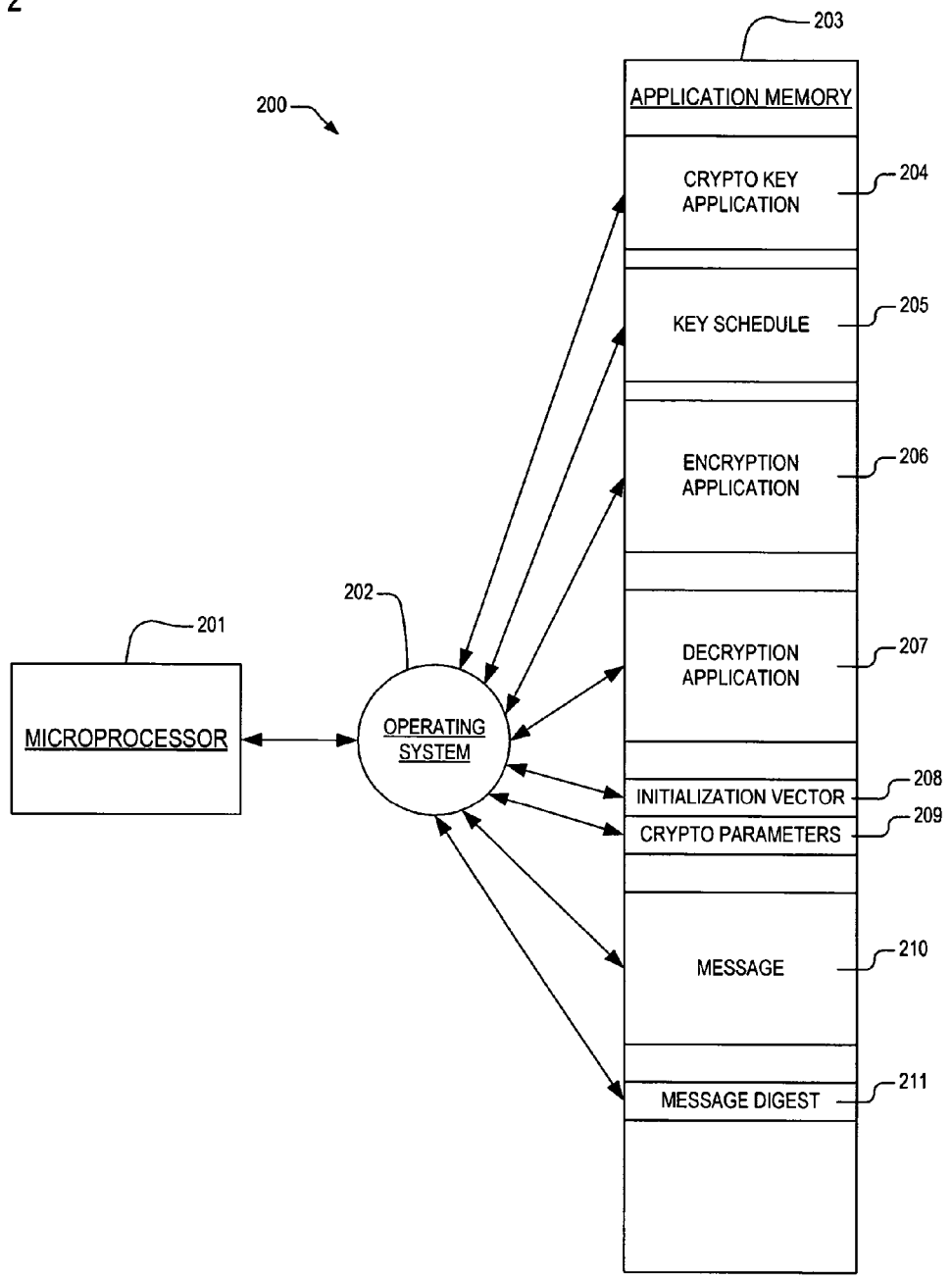
FIG. 2 is a block diagram depicting techniques for performing cryptographic operations.

In view of the above background discussion on cryptographic operations and associated techniques employed within present day computer systems to encrypt, decrypt, and generated message digests for corresponding blocks of data, the discussion of these techniques and their limitations will now be continued with reference to FIG. 2. Following this, the present invention will be discussed with reference to FIGS. 3-14. The present invention provides an apparatus and method for performing cryptographic operations in a present day computer system that exhibits superior performance characteristics over prevailing mechanisms and furthermore satisfies the above noted goals of limiting operating system intervention, atomicity, legacy and architectural compatibility, algorithmic and mode programmability, hack resistance, and testability.

Now turning to FIG. 2, a block diagram 200 is presented depicting techniques for performing cryptographic operations in a present day computer system as discussed above. The block diagram 200 includes a microprocessor 201 that fetches instructions and accesses data associated with an application program from an area of system memory called application memory 203. Program control and access of data within the application memory 203 is generally managed by operating system software 202 that resides in a protected area of system memory. As discussed above, if an executing application program (e.g., an email program or a file storage program) requires that a cryptographic operation be performed, the executing application program must accomplish the cryptographic operation by directing the microprocessor 201 to execute a significant number of instructions. These instructions may be subroutines that are part of the executing application program itself, they may be plug-in applications that are linked to the execution application program, or they may be services that are provided by the operating system 202. Regardless of their association, one skilled in the art will appreciate that the instructions will reside in some designated or allocated area of memory. For purposes of discussion, these areas of memory are shown within the application memory 203 and comprise a cryptographic key generation application 204 that typically generates or accepts a cryptographic key and expands the key into a key schedule 205 for use in cryptographic round operations. For a multi-block encryption operation, a block encryption application 206 is invoked. The encryption application 206 executes instructions that access blocks of plaintext 210 ("message" 210 in the case of a hash), the key schedule 205, cryptographic parameters 209 that further specify particulars of the encryption operation such as mode, location of the key schedule, etc. If required by specified mode, an initialization vector 208 is also accessed by the encryption application 206. The encryption application 206 executes the instructions therein to generate corresponding blocks of ciphertext 211 ("message digest" 211 in the case of a hash). Similarly, as alluded to above, a block decryption application 207 may be employed for message digest operations. The decryption application 207 executes instructions that access blocks of the message 201, the key schedule 205, cryptographic parameters 209 that further specify particulars of the block decryption operation and, if mode requires, an initialization vector 208 is also accessed. The decryption application 207 executes the instructions therein to generate the corresponding message digest 211.

It is noteworthy that a significant number of instructions must be executed in order to generate cryptographic keys and to encrypt or decrypt blocks of text. The aforementioned FIPS specifications contain many examples of pseudo code enabling the approximate number of instructions that are required to be estimated, therefore, one skilled in the art will appreciate that hundreds of instructions are required to accomplish a simple block encryption operation. And each of these instructions must be executed by the microprocessor 201 in order to accomplish the requested cryptographic operation. Furthermore, the execution of instructions to perform a cryptographic operation is generally seen as superfluous to the primary purposes (e.g., file management, instant messaging, email, remote file access, credit card transaction) of a currently executing application program. Consequently, a user of the currently executing application program senses that the currently executing application is performing inefficiently. In the case of stand-alone or plug-in encryption and decryption applications 206, 207, invocation and management of these applications 206, 207 must also be subject to the other demands of the operating system 202 such as supporting interrupts, exceptions, and like events that further exacerbate the problem. Moreover, for every concurrent cryptographic operation that is required on a computer system, a separate instance of the applications 204, 206, 207 must be allocated in memory 203. And, as noted above, it is anticipated that the number of concurrent cryptographic operations required to be performed by a microprocessor 201 will continue to increase with time.

The present inventors have noted the problems and limitations of current computer system cryptographic techniques and furthermore recognize a need to provide apparatus and methods for performing cryptographic operations including generation of message digests that utilize symmetric key algorithms in a microprocessor which do not exhibit disadvantageous program delays to users. Accordingly, the present invention provides a microprocessor apparatus and associated methodology for performing these cryptographic operations via a dedicated cryptographic instruction and cryptographic unit therein. The cryptographic unit is activated to perform cryptographic operations via programming of the single cryptographic instruction. The present invention will now be discussed with reference to FIGS. 3-12.

Figure 3:
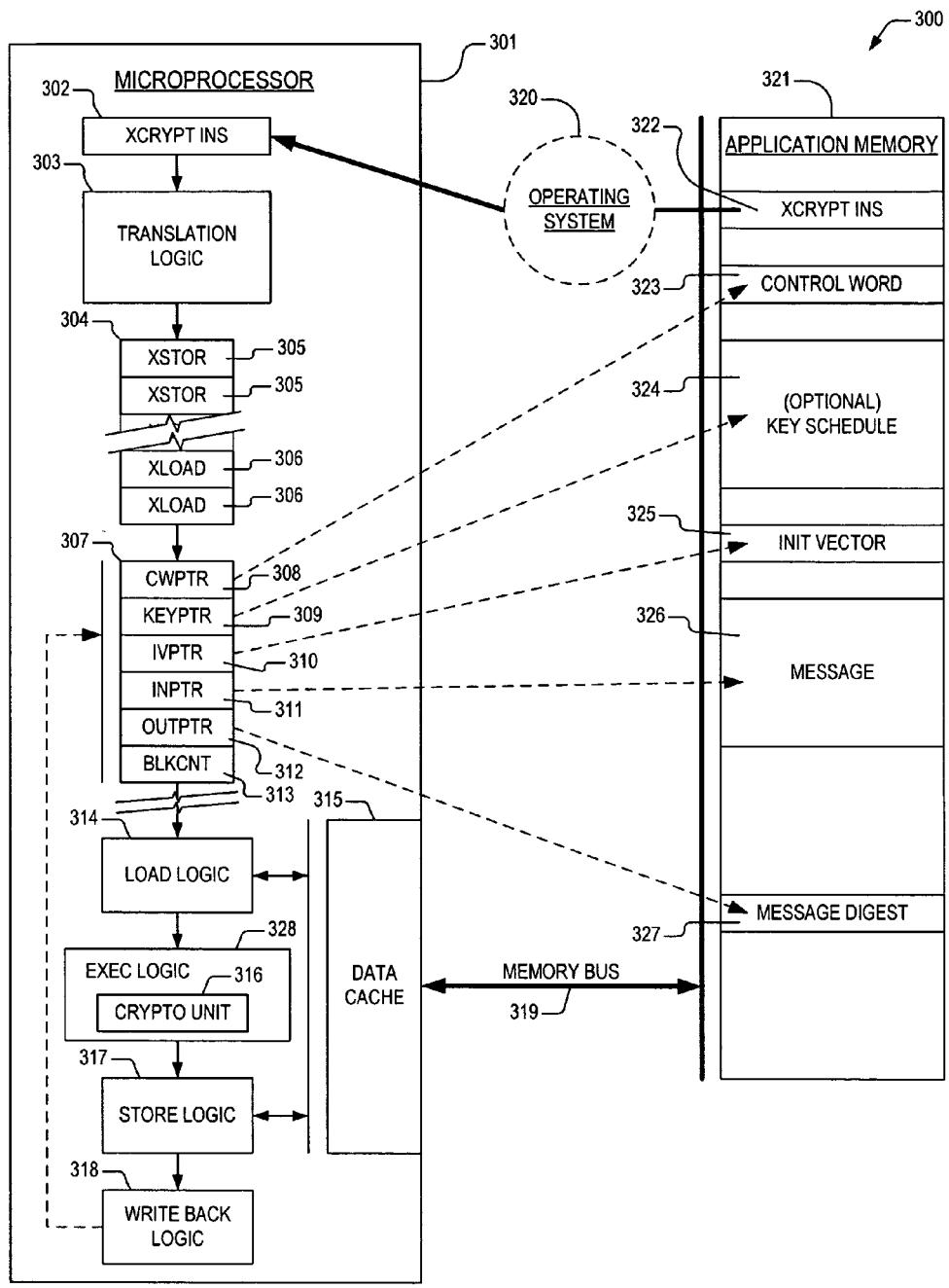
FIG. 3 is a block diagram featuring a microprocessor apparatus according to the present invention for performing cryptographic operations.

Referring to FIG. 3, a block diagram 300 is provided featuring a microprocessor apparatus according to the present invention for performing cryptographic operations. The block diagram 300 depicts a microprocessor 301 that is coupled to a system memory 321 via a memory bus 319. The microprocessor 301 includes translation logic 303 that receives instructions from an instruction register 302. The translation logic 303 comprises logic, circuits, devices, or microcode (i.e., micro instructions or native instructions), or a combination of logic, circuits, devices, or microcode, or equivalent elements that are employed to translate instructions into associated sequences of micro instructions. The elements employed to perform translation within the translation logic 303 may be shared with other circuits, microcode, etc., that are employed to perform other functions within the microprocessor 301. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor. The translation logic 303 is coupled to a micro instruction queue 304. The micro instruction queue 304 has a plurality of micro instruction entries 305, 306. Micro instructions are provided from the micro instruction queue 304 to register stage logic that includes a register file 307. The register file 307 has a plurality of registers 308-313 whose contents are established prior to performing a prescribed cryptographic operation. Registers 308-312 point to corresponding locations 323-327 in memory 321 that contain data which is required to perform the prescribed cryptographic operation. The register stage is coupled to load logic 314, which interfaces to a data cache 315 for retrieval of data for performance of the prescribed cryptographic operation. The data cache 315 is coupled to the memory 321 via the memory bus 319. Execution logic 328 is coupled to the load logic 314 and executes the operations prescribed by micro instructions as passed down from previous stages. The execution logic 328 comprises logic, circuits, devices, or microcode (i.e., micro instructions or native instructions), or a combination of logic, circuits, devices, or microcode, or equivalent elements that are employed to perform operations as prescribed by instructions provided thereto. The elements employed to perform the operations within the execution logic 328 may be shared with other circuits, microcode, etc., that are employed to perform other functions within the microprocessor 301. The execution logic 328 includes a cryptography unit 316. The cryptography unit 316 receives data required to perform the prescribed cryptographic operation from the load logic 314. Micro instructions direct the cryptography unit 316 to perform the prescribed cryptographic hash operation on a plurality of blocks of input text 326 ("message" 326) to generate a corresponding message digest 327. The cryptography unit 316 comprises logic, circuits, devices, or microcode (i.e., micro instructions or native instructions), or a combination of logic, circuits, devices, or microcode, or equivalent elements that are employed to perform cryptographic operations. The elements employed to perform the cryptographic operations within the cryptography unit 316 may be shared with other circuits, microcode, etc., that are employed to perform other functions within the microprocessor 301. In one embodiment, the cryptography unit 316 operates in parallel to other execution units (not shown) within the execution logic 328 such as an integer unit, floating point unit, etc. One embodiment of a "unit" within the scope of the present application comprises logic, circuits, devices, or microcode (i.e., micro instructions or native instructions), or a combination of logic, circuits, devices, or microcode, or equivalent elements that are employed to perform specified functions or specified operations. The elements employed to perform the specified functions or specified operations within a particular unit may be shared with other circuits, microcode, etc., that are employed to perform other functions or operations within the microprocessor 301. For example, in one embodiment, an integer unit comprises logic, circuits, devices, or microcode (i.e., micro instructions or native instructions), or a combination of logic, circuits, devices, or microcode, or equivalent elements that are employed to execute integer instructions. A floating point unit comprises logic, circuits, devices, or microcode (i.e., micro instructions or native instructions), or a combination of logic, circuits, devices, or microcode, or equivalent elements that are employed to execute floating point instructions. The elements employed execute integer instructions within the integer unit may be shared with other circuits, microcode, etc., that are employed to execute floating point instructions within the floating point unit. In one embodiment that is compatible with the x86 architecture, the cryptography unit 316 operates in parallel with an x86 integer unit, an x86 floating point unit, an x86 MMX® unit, and an x86 SSE® unit. According to the scope of the present application, an embodiment is compatible with the x86 architecture if the embodiment can correctly execute a majority of the application programs that are designed to be executed on an x86 microprocessor. An application program is correctly executed if its expected results are obtained. Alternative x86-compatible embodiments contemplate the cryptography unit operating in parallel with a subset of the aforementioned x86 execution units. The cryptography unit 316 is coupled to store logic 317 and provides the corresponding message digest 327. The store logic 317 is also coupled to the data cache 315, which routes the message digest 327 to system memory 321 for storage. The store logic 317 is coupled to write back logic 318. The write back logic 318 updates registers 308-313 within the register file 307 as the prescribed cryptographic hash operation is accomplished. In one embodiment, micro instructions flow through each of the aforementioned logic stages 302, 303, 304, 307, 314, 316-318 in synchronization with a clock signal (not shown) so that operations can be concurrently executed in a manner substantially similar to operations performed on an assembly line.

Within the system memory 321, an application program that requires the prescribed cryptographic operation can direct the microprocessor 301 to perform the operation via a single cryptographic instruction 322, referred to herein for instructive purposes as an XCRYPT instruction 322. In a CISC embodiment, the XCRYPT instruction 322 comprises an instruction that prescribes a cryptographic operation. In a RISC embodiment, the XCRYPT instruction 322 comprises a micro instruction that prescribes a cryptographic operation. In one embodiment, the XCRYPT instruction 322 utilizes a spare or otherwise unused instruction opcode within an existing instruction set architecture. In one x86-compatible embodiment, the XCRYPT instruction 322 is a 4-byte instruction comprising an x86 REP prefix (i.e., 0xF3), followed by unused x86 2-byte opcode (e.g., 0x0FA7), followed a byte detailing a specific block cipher mode to be employed during execution of a prescribed cryptographic operation. In one embodiment, the XCRPYT instruction 322 according to the present invention can be executed at the level of system privileges afforded to application programs and can thus be programmed into a program flow of instructions that are provided to the microprocessor 301 either directly by an application program or under control of an operating system 320. Since there is only one instruction 322 that is required to direct the microprocessor 301 to perform the prescribed cryptographic operation, it is contemplated that accomplishment of the operation is entirely transparent to the operating system 320.

In operation, the operating system 320 invokes an application program to execute on the microprocessor 301. As part of the flow of instructions during execution of the application program, an XCRYPT instruction 322 is provided from memory 321 to the fetch logic 302. Prior to execution of the XCRYPT instruction 322, however, instructions within the program flow direct the microprocessor 301 to initialize the contents of registers 308-312 so that they point to locations 323-327 in memory 321 that contain a cryptographic control word 323, an initial cryptographic key 324 or a key schedule 324, an initialization vector 325 (if required), message text 326 for the operation, and message digest 327. It is required to initialize the registers 308-312 prior to executing the XCRYPT instruction 322 because the XCRYPT instruction 322 implicitly references the registers 308-312 along with an additional register 313 that contains a block count, that is the number of blocks of data within the message area 326 to be hashed. Thus, the translation logic 303 retrieves the XCRYPT instruction from the fetch logic 302 and translates it into a corresponding sequence of micro instructions that directs the microprocessor 301 to perform the prescribed cryptographic operation. A first plurality of micro instructions 305-306 within the corresponding sequence of micro instructions specifically directs the cryptography unit 316 to load data provided from the load logic 314 and to begin execution of a prescribed number of cryptographic rounds to generate a corresponding block of output data and to provide the corresponding block of output data to the store logic 317 for storage in the message digest area 327 of memory 321 via the data cache 315. A second plurality of micro instructions (not shown) within the corresponding sequence of micro instructions directs other execution units (not shown) within the microprocessor 301 to perform other operations necessary to accomplish the prescribed cryptographic operation such as management of non-architectural registers (not shown) that contain temporary results and counters, update of input and output pointer registers 311-312, update of the initialization vector pointer register 310 (if required) following encryption/decryption of a block of message text 326, processing of pending interrupts, etc. In one embodiment, registers 308-313 are architectural registers. An architectural register 308-313 is a register that is defined within the instruction set architecture (ISA) for the particular microprocessor that is implemented.

In one embodiment, the cryptography unit 316 is divided into a plurality of stages thus allowing for pipelining of successive message text blocks 326.

The block diagram 300 of FIG. 3 is provided to teach the necessary elements of the present invention and thus, much of the logic within a present day microprocessor 301 has been omitted from the block diagram 300 for clarity purposes. One skilled in the art will appreciate, however, that a present day microprocessor 301 comprises many stages and logic elements according to specific implementation, some of which have been aggregated herein for clarity purposes. For instance, the load logic 314 could embody an address generation stage followed by a cache interface stage, following by a cache line alignment stage. What is important to note, however, is that a complete cryptographic operation on a plurality of blocks of message text 326 is directed according to the present invention via a single instruction 322 whose operation is otherwise transparent to considerations of the operating system 320 and whose execution is accomplished via a dedicated cryptography unit 316 that operates in parallel with and in concert with other execution units within the microprocessor 301. The present inventors contemplate provision of alternative embodiments of the cryptography unit 316 in embodiment configurations that are analogous to provision of dedicated floating point unit hardware within a microprocessor in former years. Operation of the cryptography unit 316 and associated XCRPYT instruction 322 is entirely compatible with the concurrent operation of legacy operating systems 320 and applications, as will be described in more detail below.

Now referring to FIG. 4, a block diagram is provided showing one embodiment of an atomic cryptographic instruction 400 according to the present invention. The cryptographic instruction 400 includes an optional prefix field 401, which is followed by a repeat prefix field 402, which is followed by an opcode field 403, which is followed by a block cipher mode field 404. In one embodiment, contents of the fields 401-404 comport with the x86 instruction set architecture. Alternative embodiments contemplate compatibility with other instruction set architectures.

Operationally, the optional prefix 401 is employed in many instruction set architectures to enable or disable certain processing features of a host microprocessor such as directing 16-bit or 32-bit operations, directing processing or access to specific memory segments, etc. The repeat prefix 402 indicates that the cryptographic operation prescribed by the cryptographic instruction 400 is to be accomplished on a plurality of blocks of input data. The repeat prefix 402 also implicitly directs a comporting microprocessor to employ the contents of a plurality of architectural registers therein as pointers to locations in system memory that contain cryptographic data and parameters needed to accomplish the specified cryptographic operation. As noted above, in an x86-compatible embodiment, the value of the repeat prefix 402 is 0xF3. And, according to x86 architectural protocol, the cryptographic instruction is very similar in form to an x86 repeat string instruction such as REP.MOVS. For example, when executed by an x86-compatible microprocessor embodiment of the present invention, the repeat prefix implicitly references a block count variable that is stored in architectural register ECX, a source address pointer (pointing to the input data for the cryptographic operation) that is stored in register ESI, and a destination address pointer (pointing to the output data area in memory) that is stored in register EDI. In an x86-compatible embodiment, the present invention further extends the conventional repeat-string instruction concept to further reference a control word pointer that is stored in register EDX, a cryptographic key pointer that is stored in register EBX, and a pointer to an initialization vector (if required by prescribed cipher mode) that is stored in register EAX.

The opcode field 403 prescribes that the microprocessor accomplish a cryptographic operation as further specified within a control word stored in memory that is implicitly referenced via the control word pointer. The present invention contemplates preferred choice of the opcode value 403 as one of the spare or unused opcode values within an existing instruction set architecture so as to preserve compatibility within a conforming microprocessor with legacy operating system and application software. For example, as noted above, an x86-compatible embodiment of the opcode field 403 employs value 0x0FA7 to direct execution of the specified cryptographic operation. The block cipher mode field 404 prescribes the particular block cipher mode to be employed during the specified cryptographic operation, as will now be discussed with reference to FIG. 5.

FIG. 5 is a table 500 illustrating exemplary block cipher mode field values according to the atomic cryptographic instruction of FIG. 4. Value 0xC8 prescribes that the cryptographic operation be accomplished using electronic code book (ECB) mode. Value 0xD0 prescribes that the cryptographic operation be accomplished using cipher block chaining (CBC) mode. Value 0xD8 prescribes that the cryptographic operation be accomplished using counter (CTR) mode. Value 0xE0 prescribes that the cryptographic operation be accomplished using cipher feedback (CFB) mode. And value 0xE8 prescribes that the cryptographic operation be accomplished using output feedback (OFB) mode. All other values of the block cipher mode field 404 are reserved. These modes are described in the aforementioned FIPS documents.

Figure 6:
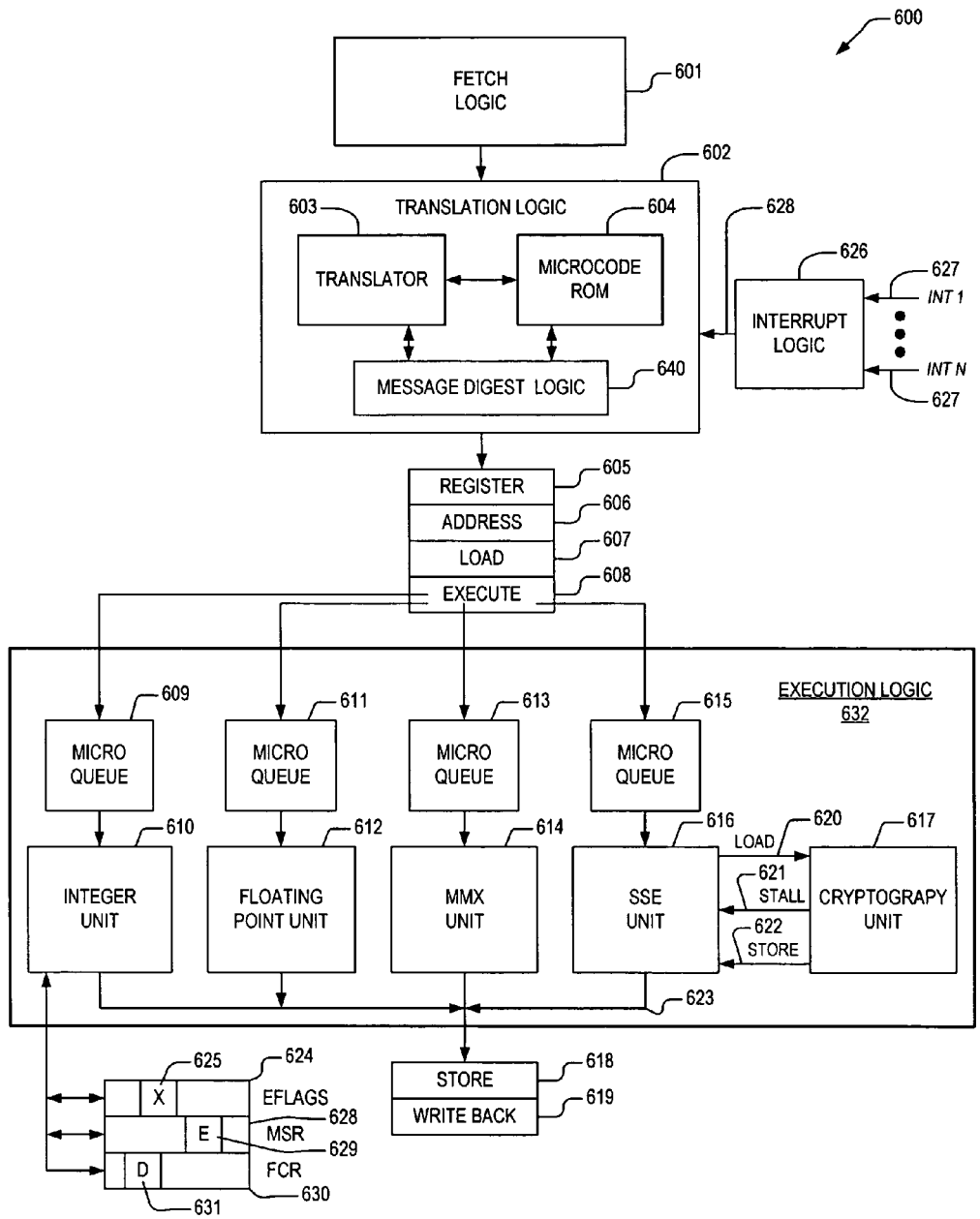
FIG. 6 is a block diagram detailing a cryptography unit within an x86-compatible microprocessor according to the present invention.

Now turning to FIG. 6, a block diagram is presented detailing a cryptography unit 617 within an x86-compatible microprocessor 600 according to the present invention. The microprocessor 600 includes fetch logic 601 that fetches instructions from memory (not shown) for execution. The fetch logic 601 is coupled to translation logic 602. The translation logic 602 comprises logic, circuits, devices, or microcode (i.e., micro instructions or native instructions), or a combination of logic, circuits, devices, or microcode, or equivalent elements that are employed to translate instructions into associated sequences of micro instructions. The elements employed to perform translation within the translation logic 602 may be shared with other circuits, microcode, etc., that are employed to perform other functions within the microprocessor 600. The translation logic 602 includes a translator 603 that is coupled to a microcode ROM 604, and message digest logic 640 that is coupled to both the translator 603 and the microcode ROM 604. Interrupt logic 626 couples to the translation logic 602 via bus 628. A plurality of software and hardware interrupt signals 627 are processed by the interrupt logic 626 which indicates pending interrupts to the translation logic 602. The translation logic 602 is coupled to successive stages of the microprocessor 600 including a register stage 605, address stage 606, load stage 607, execute stage 608, store stage 618, and write back stage 619. Each of the successive stages include logic to accomplish particular functions related to the execution of instructions that are provided by the fetch logic 601 as has been previously discussed with reference like-named elements in the microprocessor of FIG. 3. The x86-compatible embodiment 600 depicted in FIG. 6 features execution logic 632 within the execute stage 608 that includes parallel execution units 610, 612, 614, 616, 617. An integer unit 610 receives integer micro instructions for execution from micro instruction queue 609. A floating point unit 612 receives floating point micro instructions for execution from micro instruction queue 611. An MMX® unit 614 receives MMX micro instructions for execution from micro instruction queue 613. An SSE® unit 616 receives SSE micro instructions for execution from micro instruction queue 615. In the exemplary x86 embodiment shown, a cryptography unit 617 is coupled to the SSE unit 616 via a load bus 620, a stall signal 621, and a store bus 622. The cryptography unit 617 shares the SSE unit's micro instruction queue 615. An alternative embodiment contemplates standalone parallel operation of the cryptography unit 617 in a manner like that of units 610, 612, and 614. The integer unit 610 is coupled an x86 EFLAGS register 624. The EFLAGS register includes an X bit 625 whose state is set to indicate whether or not cryptographic operations are currently in process. In one embodiment the X bit 625 is bit 30 of an x86 ELFAGS register 624. In addition, the integer unit 610 access a machine specific register 628 to evaluate the state of an E bit 629. The state of the E bit 629 indicates whether or not the cryptography unit 617 is present within the microprocessor 600. The integer unit 610 also accesses a D bit 631 in a feature control register 630 to enable or disable the cryptography unit 617. As with the microprocessor embodiment 301 of FIG. 3, the microprocessor 600 of FIG. 6 features elements essential to teach the present invention in the context of an x86-compatible embodiment and for clarity aggregates or omits other elements of the microprocessor. One skilled in the art will appreciate that other elements are required to complete the interface such as a data cache (not shown), bus interface unit (not shown), clock generation and distribution logic (not shown), etc.

In operation, instructions are fetched from memory (not shown) by the fetch logic 601 and are provided in synchronization with a clock signal (not shown) to the translation logic 602. The translation logic 602 translates each instruction into a corresponding sequence of micro instructions that are sequentially provided in synchronization with the clock signal to subsequent stages 605-608, 618, 619 of the microprocessor 600. Each micro instruction within a sequence of micro instructions directs execution of a sub-operation that is required to accomplish an overall operation that is prescribed by a corresponding instruction such as generation of an address by the address stage 606, addition of two operands within the integer unit 610 which have been retrieved from prescribed registers (not shown) within the register stage 605, storage of a result generated by one of the execution units 610, 612, 614, 616, 617 in memory by the store logic 618, etc. Depending upon the instruction that is being translated, the translation logic 602 will employ the translator 603 to directly generate the sequence of micro instructions, or it will fetch the sequence from the microcode ROM 604, or it will employ the translator 603 to directly generate a portion of the sequence and fetch the remaining portion of the sequence from the microcode ROM 604. The micro instructions proceed sequentially through the successive stages 605-608, 618, 619 of the microprocessor 600 in synchronization with the clock. As micro instructions reach the execute stage 608, they are routed by the execution logic 632 along with their operands (retrieved from registers within the register stage 605, or generated by logic within the address stage 606, or retrieved from a data cache by the load logic 607) to a designated execution unit 610, 612, 614, 616, 617 by placing the micro instructions in a corresponding micro instruction queue 609, 611, 613, 615. The execution units 610, 612, 614, 616, 617 execute the micro instructions and provide results to the store stage 618. In one embodiment, the micro instructions include fields indicating whether or not they can be executed in parallel with other operations.

Responsive to fetching an XCRYPT instruction as described above, the translation logic 602 generates associated micro instructions that direct logic within subsequent stages 605-608, 618, 619 of the microprocessor 600 to perform the prescribed cryptographic operation. A first plurality of the associated micro instructions are routed directly to the cryptography unit 617 and direct the unit 617 to load data provided over the load bus 620, or to load a block of input data and begin execution of a prescribed number of cryptographic rounds to produce a block of output data, or to provide a produced block of output data over the store bus 622 for storage in memory by the store logic 618. A second plurality of the associated micro instructions are routed to other execution units 610, 612, 614, 616 to perform other sub-operations that are necessary to accomplish the prescribed cryptographic operation such as testing of the E bit 629, enabling the D bit 631, setting the X bit 625 to indicate that a cryptographic operation is in process, updating registers (e.g., count register, input text pointer register, output text pointer register) within the register stage 605, processing of interrupts 627 indicated by the interrupt logic 626, etc. The associated micro instructions are ordered to provide for optimum performance of specified cryptographic operations on multiple blocks of input data by interlacing integer unit micro instructions within sequences of cryptography unit micro instructions so that integer operations can be accomplished in parallel with cryptography unit operations. Micro instructions are included in the associated micro instructions to allow for and recover from pending interrupts 627. Because all of the pointers to cryptographic parameters and data are provided within x86 architectural registers, their states are saved when interrupts are processed and the states are restored upon return from interrupts. Hence, when an interrupt occurs, program control is transferred to a corresponding interrupt service routine. As part of that transfer of program control, the X bit 625 is cleared to indicate that key data and control word data are no longer valid. Upon return from an interrupt, program control is transferred back to the XCRYPT instruction and as a part of it's associated micro instructions, particular micro instructions test the state of the X bit 625 to determine if key data and control word data are valid. If so, the operation is repeated on the particular block of input data that was being processed when the interrupt occurred. If the state of the X bit 625 indicates that key data and control word data are no longer valid, then the key data and control word are reloaded from memory along with the particular block of input data that was being processed when the interrupt occurred. To summarize, execution of an XCRYPT instruction according to the present invention always involves initial testing of the X bit 625 to determine validity of key data and control word data within the cryptography unit 617. If key data and control word data are not valid, then the key data and control word data are loaded from memory. Then an input data block pointed to by contents of the input pointer register are loaded and the prescribed cryptographic operation is executed on the input data block. Otherwise, the input data block is loaded and the prescribed cryptographic operation is executed without first loading the key data and control word data.

If new key data or a new control word are provided, then it is required that the X bit 625 be cleared prior to executing a new XCRYPT instruction. It is also contemplated that successive XCRYPT instructions can be executed that employ the same key data and control word data. In this case, it is not required to clear the X bit 625 after the initial key data and control word data are loaded. For example, for optimization purposes related to memory bus speed, a user may break up encryption/decryption of, say, 500 input data blocks into 5 XCRYPT instructions that each process 100 input data blocks.

The message digest logic 640 is employed for the performance of message digest generation operations. The message digest logic 640 ensures that the associated micro instructions are ordered to allow for the pointer registers and intermediate hash results of a sequence of block cryptographic operations on a sequence of message blocks to be updated prior to processing interrupts 627. The message digest logic 640 directs that micro instructions be inserted into the flow of associated micro instructions such that at the completion of a cryptographic operation (i.e., encryption or decryption) on a first block of message data, the pointer to the input data block in memory is modified to point to a next message block. The output pointer is kept to a constant value such that each successive intermediate hash result overwrites the previously generated hash result. In addition, the message digest logic 640 directs that micro instructions be inserted into the flow of associated micro instructions to modify the block counter to indicate that the cryptographic operation has been completed on the current block of message data. For example, one skilled in the art will appreciate that a message digest using an encryption operation under the OFB mode employs an initialization vector that is utilized along with a first block of message text to produce a first intermediate hash block of the same size. A forward cipher operation is applied to the initialization vector to produce a first cipher output block. Then a first ciphertext block is produced by exclusive-ORing the first cipher output block with the first intermediate hash block. The first cipher output block is then fed forward as an initialization vector equivalent for encryption of a second message block. And so on. A message digest operation using an OFB mode decryption is accomplished in the very same manner as a message digest operation using OFB encryption except that intermediate hash blocks are generated by exclusive-ORing message blocks with cipher output blocks. Forward cipher operations are applied to the initialization vector and subsequent initialization vector equivalents to produce the cipher output blocks.

In one embodiment, the message digest logic 640 distinguishes a prescribed message digest generation operation according to specified block cipher mode and provides for a sequence of micro instructions that update pointers within the architectural registers to ensure that, for blocks following a first message block, the proper block data is fed forward for use in generating the next intermediate hash value.

Now referring to FIG. 7, a diagram is presented illustrating fields within an exemplary micro instruction 700 for directing cryptographic sub-operations within the microprocessor of FIG. 6. The micro instruction 700 includes a micro opcode field 701, a data register field 702, and a register field 703. The micro opcode field 701 specifies a particular sub-operation to be performed and designates logic within one or more stages of the microprocessor 600 to perform the sub-operation. Specific values of the micro opcode field 701 designate that the micro instruction is directed for execution by a cryptography unit according to the present invention. In one embodiment, there are two specific values. A first value (XLOAD) designates that data is to be retrieved from a memory location whose address is specified by contents of an architectural register denoted by contents of the data register field 702. The data is to be loaded into a register within the cryptography unit that is specified by contents of the register field 703. The retrieved data (e.g., cryptographic key data, control word, message data, initialization vector) is provided to the cryptography unit. A second value (XSTOR) of the micro opcode field 701 designates that message digest data generated by the cryptography unit is to be stored in a memory location whose address is specified by contents of an architectural register denoted by contents of the data register field 702. The message digest block is provided by the cryptography unit for access by store logic. More specific details concerning XLOAD and XSTOR micro instructions for execution by a cryptography unit according to the present invention will now be discussed with reference to FIGS. 8 and 9.

Turning to FIG. 8, a table 800 is presented depicting values of the register field 703 for an XLOAD micro instruction according to the format 700 of FIG. 7. As was previously discussed, a sequence of micro instructions is generated in response to translation of an XCRPYT instruction. The sequence of micro instructions comprises a first plurality of micro instructions that are directed for execution by the cryptography unit and a second plurality of micro instructions that are executed by one or more of the parallel functional units within the microprocessor other that the cryptography unit. The second plurality of micro instructions direct sub-operations such as updating of counters, temporary registers, architectural registers, testing and setting of status bits in machine specific registers, and so on. The first plurality of instructions provide key data, cryptographic parameters, and message data to the cryptography unit and direct the cryptography unit to generate key schedules (or to load key schedules that have been retrieved from memory), to load and encrypt (or decrypt) message data, and to store message digest data. An XLOAD micro instruction is provided to the cryptography unit to load control word data, to load a cryptographic key or key schedule, to load initialization vector data, to load message data, and to load message data and direct the cryptography unit to begin a prescribed cryptographic operation. Value 0b010 in the register field 703 of an XLOAD micro instruction directs the cryptography unit to load a control word into its internal control word register. As this micro instruction proceeds down the pipeline, an architectural control word pointer register within the register stage is accessed to obtain the address in memory where the control word is stored. Address logic translates the address into a physical address for a memory access. The load logic fetches the control word from cache and passes the control word to the cryptography unit. Likewise, register field value 0b100 directs the cryptography unit to load input text data and, following the load, to start the prescribed cryptographic operation. Like the control word, the input data is accessed via a pointer stored in an architectural register. Value 0b101 directs that input data be loaded into internal register 1 IN-1. Data loaded into IN-1 register can be either input text data (when pipelining) or an initialization vector. Values 0b110 and 0b111 direct the cryptography unit to load lower and upper bits, respectively, of a cryptographic key or one of the keys in a user-generated key schedule. According to the present application, a user is defined as that which performs a specified function or specified operation. The user can embody an application program, an operating system, a machine, or a person. Hence, the user-generated key schedule, in one embodiment, is generated by an application program. In an alternative embodiment, the user-generated key schedule is generated by a person.

If a user-generated key schedule is employed to perform the cryptographic operation, then a number of XLOAD micro instructions that correspond to the number of keys within the user-generated key schedule are routed to the cryptography unit that direct the unit to load each round key within the key schedule.

All other values of the register field 703 in an XLOAD micro instruction are reserved.

Referring to FIG. 9, a table 900 is presented showing values of the register field 703 for an XSTOR micro instruction according to the format 700 of FIG. 7. An XSTOR micro instruction is issued to the cryptography unit to direct it to provide a generated (i.e., encrypted or decrypted) output text block to store logic for storage in memory at the address provided in the address field 702. Accordingly, translation logic according to the present invention issues an XSTOR micro instruction for a particular output text block following issuance of an XLOAD micro instruction for its corresponding input text block. Value 0b100 of the register field 703 directs the cryptography unit to provide the output text block associated with its internal output-0 OUT-0 register to store logic for storage. Contents of OUT-0 are associated with the input text block provided to IN-0. Likewise, contents of internal output-1 register, referenced by register field value 0b101, are associated with the input text data provided to IN-1. Accordingly, following loading of keys and control word data, a plurality of input text blocks can be pipelined through the cryptography unit by issuing cryptographic micro instructions in the order XLOAD.IN-1, XLOAD.IN-0 (XLOAD.IN-0 directs the cryptography unit to start the cryptographic operation as well), XSTOR.OUT-1, XSTOR.OUT-0, XLOAD.IN-1, XLOAD.IN-0 (starts the operation for the next two input text blocks), and so on.

Figure 10:
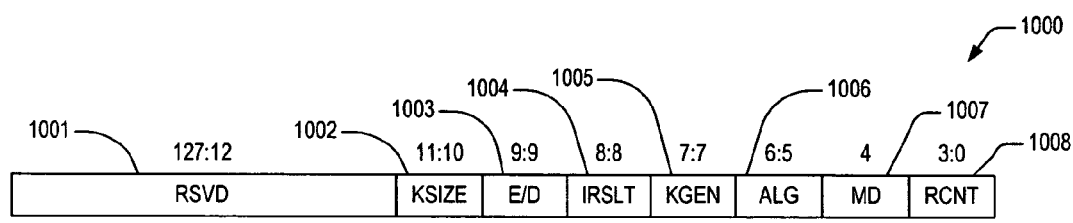
FIG. 10 is diagram highlighting an exemplary control word format for prescribing cryptographic parameters of a cryptography operation according to the present invention.

Now turning to FIG. 10, a diagram is provided highlighting an exemplary control word format 1000 for prescribing cryptographic parameters of a cryptographic operation according to the present invention. The control word 1000 is programmed into memory by a user and its pointer is provided to an architectural register within a conforming microprocessor prior to performing cryptographic operations. Accordingly, as part of a sequence of micro instructions corresponding to a provided XCRYPT instruction, an XLOAD micro instruction is issued directing the microprocessor to read the architectural register containing the pointer, to convert the pointer into a physical memory address, to retrieve the control word 1000 from memory (cache), and to load the control word 1000 into the cryptography unit's internal control word register. The control word 1000 includes a reserved RSVD field 1001, key size KSIZE field 1002, an encryption/decryption E/D field 1003, an intermediate result IRSLT field 1004, a key generation KGEN field 1005, an algorithm ALG field 1006, a message digest MD field 1007, and a round count RCNT field 1008.

All values for the reserved field 1001 are reserved. Contents of the KSIZE field 1002 prescribe the size of a cryptographic key that is to be employed to accomplish encryption or decryption. In one embodiment, the KSIZE field 1002 prescribes either a 128-bit key, a 192-bit key, or a 256-bit key. The E/D field 1003 specifies whether the cryptographic operation is to be an encryption operation or a decryption operation. The KGEN field 1005 indicates if a user-generated key schedule is provided in memory or if a single cryptographic key is provided in memory. If a single cryptographic key is provided, then micro instructions are issued to the cryptography unit along with the cryptographic key directing the unit to expand the key into a key schedule according to the cryptographic algorithm that is specified by contents of the ALG field 1006. In one embodiment, the ALG field 1006 specifies the DES algorithm, the Triple-DES algorithm, or the AES algorithm as has heretofore been discussed. Alternative embodiments contemplate other cryptographic algorithms such as the Rijndael Cipher, the Twofish Cipher, etc. Contents of the MD field 1007 direct whether a message digest is to be generated or whether a normal encryption or decryption operation is to be performed. Contents of the RCNT field 1008 prescribe the number of cryptographic rounds that are to be accomplished on each block of input text according to the specified algorithm. Although the standards for the above-noted algorithms prescribed a fixed number of cryptographic rounds per input text block, provision of the RCNT field 1007 allows a programmer to vary the number of rounds from that specified by the standards. In one embodiment, the programmer can specify from 0 to 15 rounds per block. Finally, contents of the IRSLT field 1004 specify whether encryption/decryption of an input text block is to be performed for the number of rounds specified in RCNT 1008 according to the standard for the cryptographic algorithm specified in ALG 1006 or whether the encryption/decryption is to be performed for the number of rounds specified in RCNT 1008 where the final round performed represents an intermediate result rather than a final result according to the algorithm specified in ALG 1006. One skilled in the art will appreciate that many cryptographic algorithms perform the same sub-operations during each round, except for those performed in the final round. Hence, programming the IRSLT field 1004 to provide intermediate results rather than final results allows a programmer to verify intermediate steps of the implemented algorithm. For example, incremental intermediate results to verify algorithm performance can be obtained by, say, performing one round of encryption on a text block, then performing two rounds on the same text block, then three round, and so on. The capability to provide programmable rounds and intermediate results enables users to verify cryptographic performance, to troubleshoot, and to research the utility of varying key structures and round counts.

Figure 11:
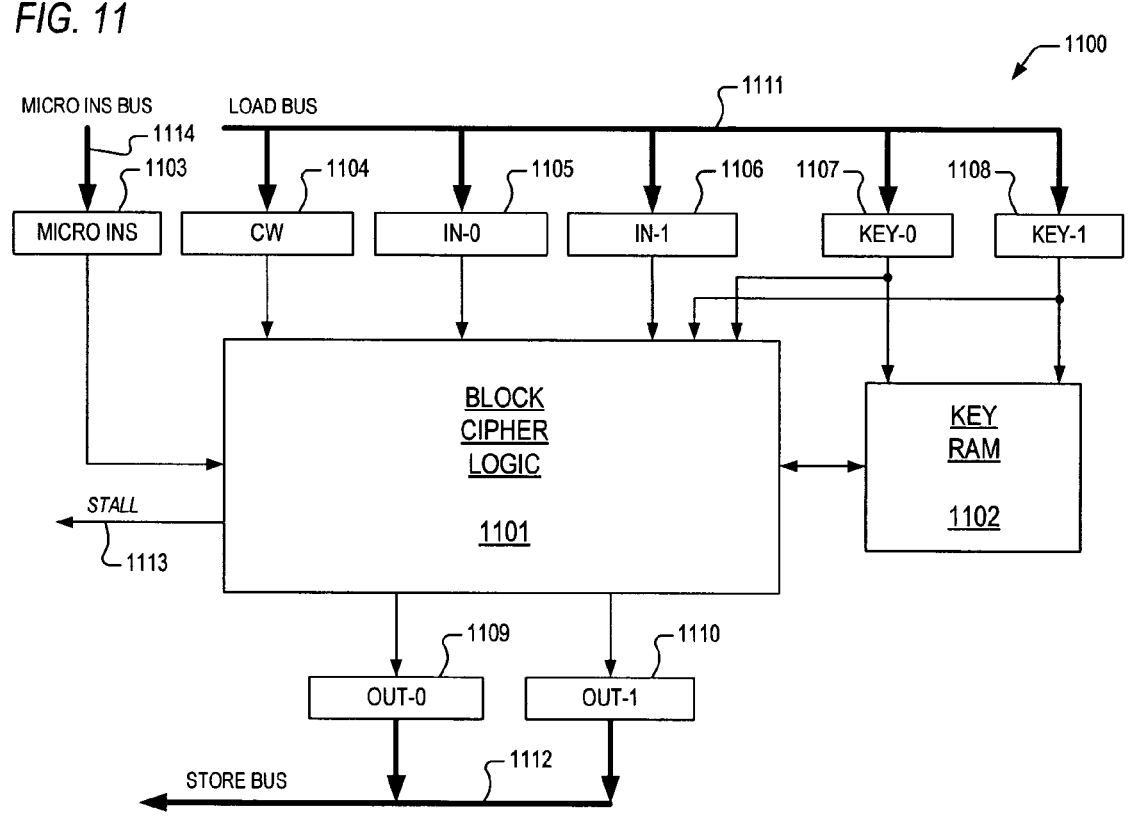
FIG. 11 is a block diagram featuring details of a cryptography unit according to the present invention.

Now referring to FIG. 11, a block diagram is presented featuring details of a cryptography unit 1100 according to the present invention. The cryptography unit 1100 includes a micro opcode register 1103 that receives cryptographic micro instructions (i.e., XLOAD and XSTOR micro instructions) via a micro instruction bus 1114. The cryptography unit 1100 also has a control word register 1104, an input-0 register 1105, and input-1 register 1106, a key-0 register 1107, and a key-1 register 1108. Data is provided to registers 1104-1108 via a load bus 1111 as prescribed by contents of an XLOAD micro instruction within the micro instruction register 1103. The cryptography unit 1100 also includes block cipher logic 1101 that is coupled to all of the registers 1103-1108 and that is also coupled to cryptographic key RAM 1102. The block cipher logic provides a stall signal 1113 and also provides block results to an output-0 register 1109 and an output-1 register 1110. The output registers 1109-1110 route their contents to successive stages in a conforming microprocessor via a store bus 1112. In one embodiment, the micro instruction register 1103 is 32 bits in size and each of the remaining registers 1104-1110 are 128-bit registers.

Operationally, cryptographic micro instructions are provided sequentially to the micro instruction register 1103 along with data that is designated for the control word register 1104, or one of the input registers 1105-1106, or one of the key registers 11071108. In the embodiment discussed with reference to FIGS. 8 and 9, a control word is first loaded via an XLOAD micro instruction to the control word register 1104. Then the cryptographic key or key schedule is loaded via successive XLOAD micro instructions. If a 128-bit cryptographic key is to be loaded, then an XLOAD micro instruction is provided designating register KEY-0 1107. If a cryptographic key greater than 128 bits is to be loaded, then an XLOAD micro instruction is provided designating register KEY-0 1107 is provided along with an XLOAD micro instruction designating register KEY-1 1108. If a user-generated key schedule is to be loaded, then successive XLOAD micro instructions designating register KEY-0 1107 are provided. Each of the keys from the key schedule that are loaded are placed, in order, in the key RAM 1102 for use during their corresponding cryptographic round. Following this, input text data (if an initialization vector is not required) is loaded to IN-1 register 1106. If an initialization vector is required, then it is loaded into IN-1 register 1106 via an XLOAD micro instruction. An XLOAD micro instruction to IN-0 register 1105 directs the cryptography unit to load input text data to IN-0 register 1105 and to begin performing cryptographic rounds on input text data in register IN-0 1105 using the initialization vector in IN-1 or in both input registers 1105-1106 (if input data is being pipelined) according to the parameters provided via contents of the control word register 1104. Upon receipt of an XLOAD micro instruction designating IN-0 1105, the block cipher logic starts performing the cryptographic operation prescribed by contents of the control word. If expansion of a single cryptographic key is required, then the block cipher logic generates each of the keys in the key schedule and stores them in the key RAM 1102. In an alternative embodiment the block cipher logic generates each of the keys in the key schedule and stores them in the key RAM 1102 prior to receipt of the XLOAD micro instruction designating IN-0 1105. Regardless of whether the block cipher logic 1101 generates a key schedule or whether the key schedule is loaded from memory, the key for the first round is cached within the block cipher logic 1101 so that the first block cryptographic round can proceed without having to access the key RAM 1102. Once initiated, the block cipher logic continues executing the prescribed cryptographic operation on one or more blocks of input text until the operation is completed, successively fetching round keys from the key RAM 1102 as required by the cryptographic algorithm which is employed. The cryptography unit 1100 performs a specified block cryptographic operation on designated blocks of input text. Successive blocks of input text are encrypted or decrypted through the execution of corresponding successive XLOAD and XSTOR micro instructions. When an XSTOR micro instruction is executed, if the prescribed output data (i.e., OUT-0 or OUT-1) has not yet completed generation, then the block cipher logic asserts the stall signal 1113. Once the output data has been generated and placed into a corresponding output register 1109-1110, then the contents of that register 1109-1110 are transferred to the store bus 1112.

Figure 12:
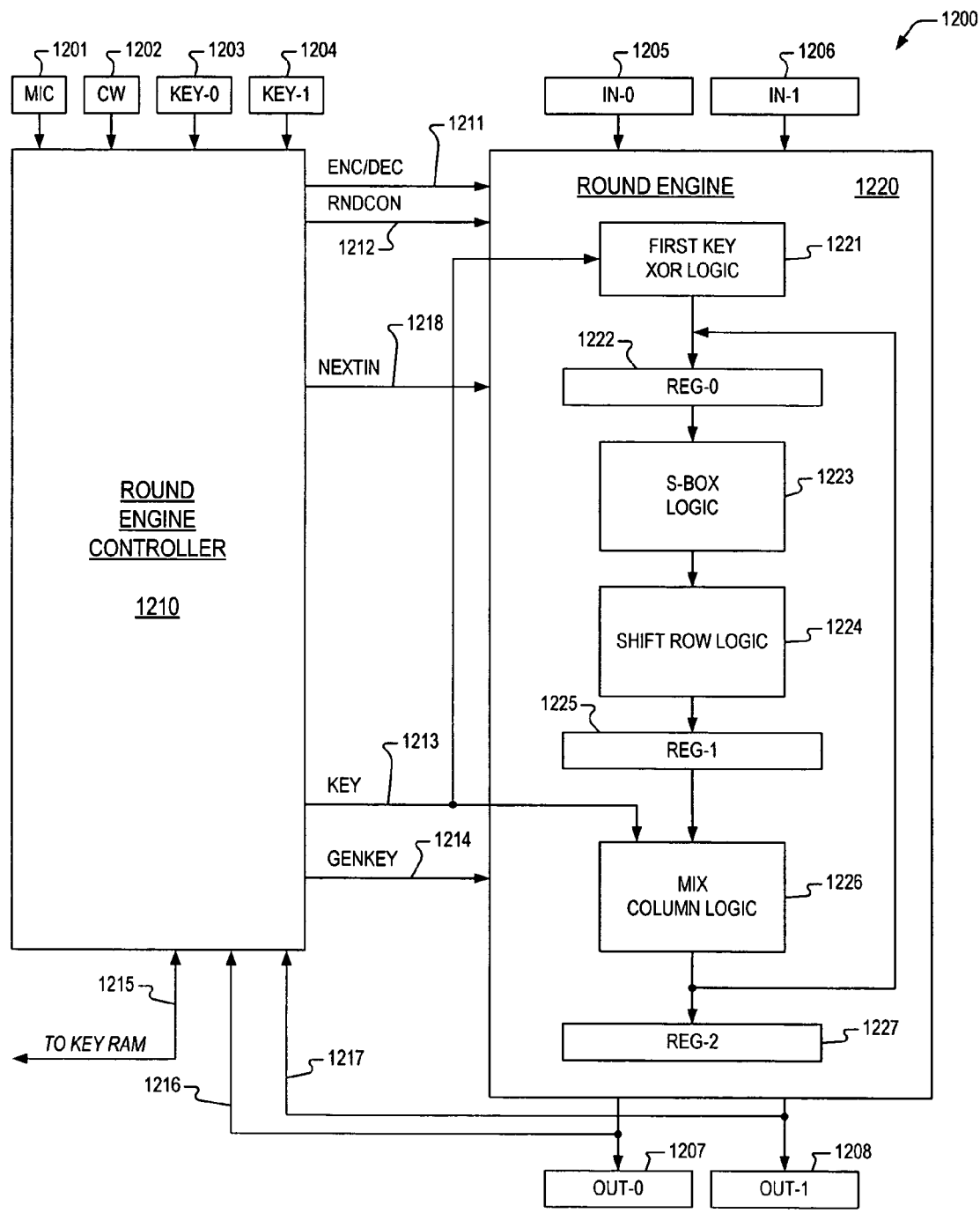
FIG. 12 is a block diagram illustrating an embodiment of block cipher logic according to the present invention for performing cryptographic operations in accordance with the Advanced Encryption Standard (AES)

Now turning to FIG. 12, a block diagram is provided illustrating an embodiment of block cipher logic 1200 according to the present invention for performing cryptographic operations in accordance with the Advanced Encryption Standard (AES). The block cipher logic 1200 includes a round engine 1220 that is coupled to a round engine controller 1210 via buses 1211-1214 and buses 1216-1218. The round engine controller 1210 accesses a micro instruction register 1201, control word register 1202, KEY-0 register 1203, and KEY-1 register 1204 to access key data, micro instructions, and parameters of the directed cryptographic operation. Contents of input registers 1205-1206 are provided to the round engine 1220 and the round engine 1220 provides corresponding output text to output registers 1207-1208. The output registers 1207-1208 are also coupled to the round engine controller 1210 via buses 1216-1217 to enable the round engine controller access to the results of each successive cryptographic round, which is provided to the round engine 1220 for a next cryptographic round via bus NEXTIN 1218. Cryptographic keys from key RAM (not shown) are accessed via bus 1215. Signal ENC/DEC 1211 directs the round engine to employ sub-operations for performing either encryption (e.g., S-Box) or decryption (e.g., Inverse S-Box). Contents of bus RND-CON 1212 direct the round engine 1220 to perform either a first AES round, an intermediate AES round, or a final AES round. Signal GENKEY 1214 is asserted to direct the round engine 1220 to generate a key schedule according to the key provided via bus 1213. Key bus 1213 is also employed to provide each round key to the round engine 1220 when its corresponding round is executed.

The round engine 1220 includes first key XOR logic 1221 that is coupled to a first register REG-0 1222. The first register 1222 is coupled to S-Box logic 1223, which is coupled to Shift Row logic 1224. The Shift Row logic 1224 is coupled to a second register REG-1 1225. The second register 1225 is coupled to Mix Column logic 1226, which is coupled to a third register REG-2 1227. The first key logic 1221, S-Box logic 1223, Shift Row logic 1224, and Mix Column logic 1226 are configured to perform like-named sub-operations on input text data as is specified in the AES FIPS standard discussed above. The Mix Columns logic 1226 is additionally configured to perform AES XOR functions on input data during intermediate rounds as required using round keys provided via the key bus 1213. The first key logic 1221, S-Box logic 1223, Shift Row logic 1224, and Mix Column logic 1226 are also configured to perform their corresponding inverse AES sub-operations during decryption as directed via the state of ENC/DEC 1211. One skilled in the art will appreciate that intermediate round data is fed back to the round engine 1220 according to which particular block encryption mode is prescribed via contents of the control word register 1202. Initialization vector data (if required) is provided to the round engine 1220 via bus NEXTIN 1218.

In the embodiment shown in FIG. 12, the round engine is divided into two stages: a first stage between REG-0 1222 and REG-1 1225 and a second stage between REG-1 1225 and REG-2 1227. Intermediate round data is pipelined between stages in synchronization with a clock signal (not shown). When a cryptographic operation is completed on a block of input data, the associated output data is placed into a corresponding output register 1207-1208. Execution of an XSTOR micro instruction causes contents of a designated output register 1207-1208 to be provided to a store bus (not shown).

Figure 13:
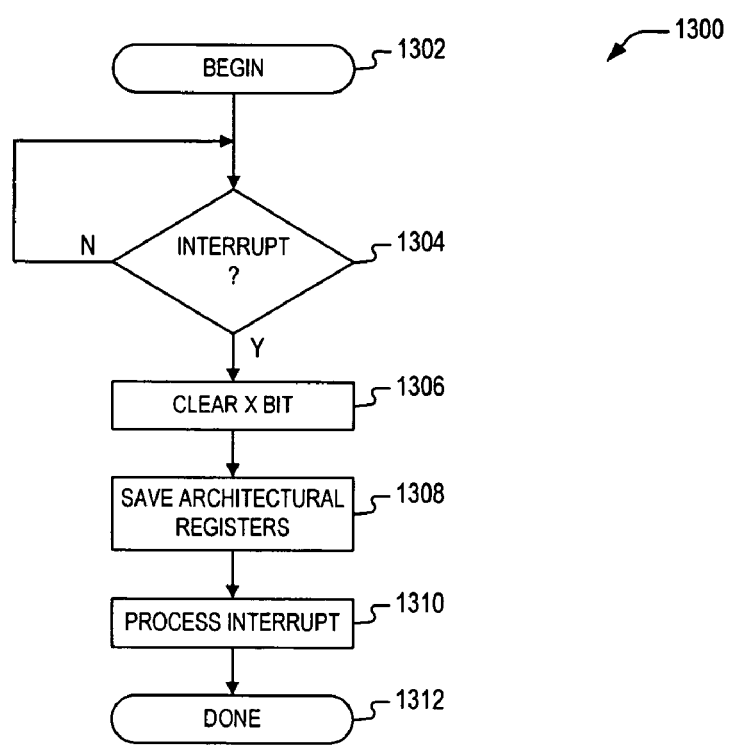
FIG. 13 is a flow chart featuring a method according to the present invention for preserving the state of cryptographic parameters during an interrupting event.

Now turning to FIG. 13, a flow chart is presented featuring a method according to the present invention for preserving the state of cryptographic parameters during an interrupting event. Flow begins at block 1302 when a flow of instructions is executed by a microprocessor according to the present invention. It is not necessary that the flow of instructions include an XCRYPT instruction as is herein described. Flow then proceeds to decision block 1304.

At decision block 1304, an evaluation is made to determine if an interrupting event (e.g., maskable interrupt, non-maskable interrupt, page fault, task switch, etc.) is occurring that requires a change in the flow of instructions over to a flow of instructions ("interrupt handler") to process the interrupting event. If so, then flow proceeds to block 1306. If not, then flow loops on decision block 1304 where instruction execution continues until an interrupting event occurs.

At block 1306, because an interrupting event has occurred, prior to transferring program control to a corresponding interrupt handler, interrupt logic according to the present invention directs that the X bit within a flags register be cleared. Clearing of the X bit ensures that, upon return from the interrupt handler, if a block cryptographic operation was in progress, it will be indicated that one or more interrupting events transpired and that control word data and key data must be reloaded prior to continuing the block cryptographic operation on the block of input data currently pointed to by contents of the input pointer register. Flow then proceeds to block 1308.

At block 1308, all of the architectural registers containing pointers and counters associated with performance of a block cryptographic operation according to the present invention are saved to memory. One skilled in the art will appreciate that the saving of architectural registers is an activity that is typically accomplished in a present data computing device prior to transferring control to interrupt handlers. Consequently, the present invention exploits this aspect of present data architectures to provide for transparency of execution throughout interrupting events. After the registers are saved, flow then proceeds to block 1310.

At block 1310, program flow is transferred to the interrupt handler. Flow then proceeds to block 1312.

At block 1312, the method completes. One skilled in the art will appreciate that the method of FIG. 13 begins again at block 1302 upon return from the interrupt handler.

Figure 14:
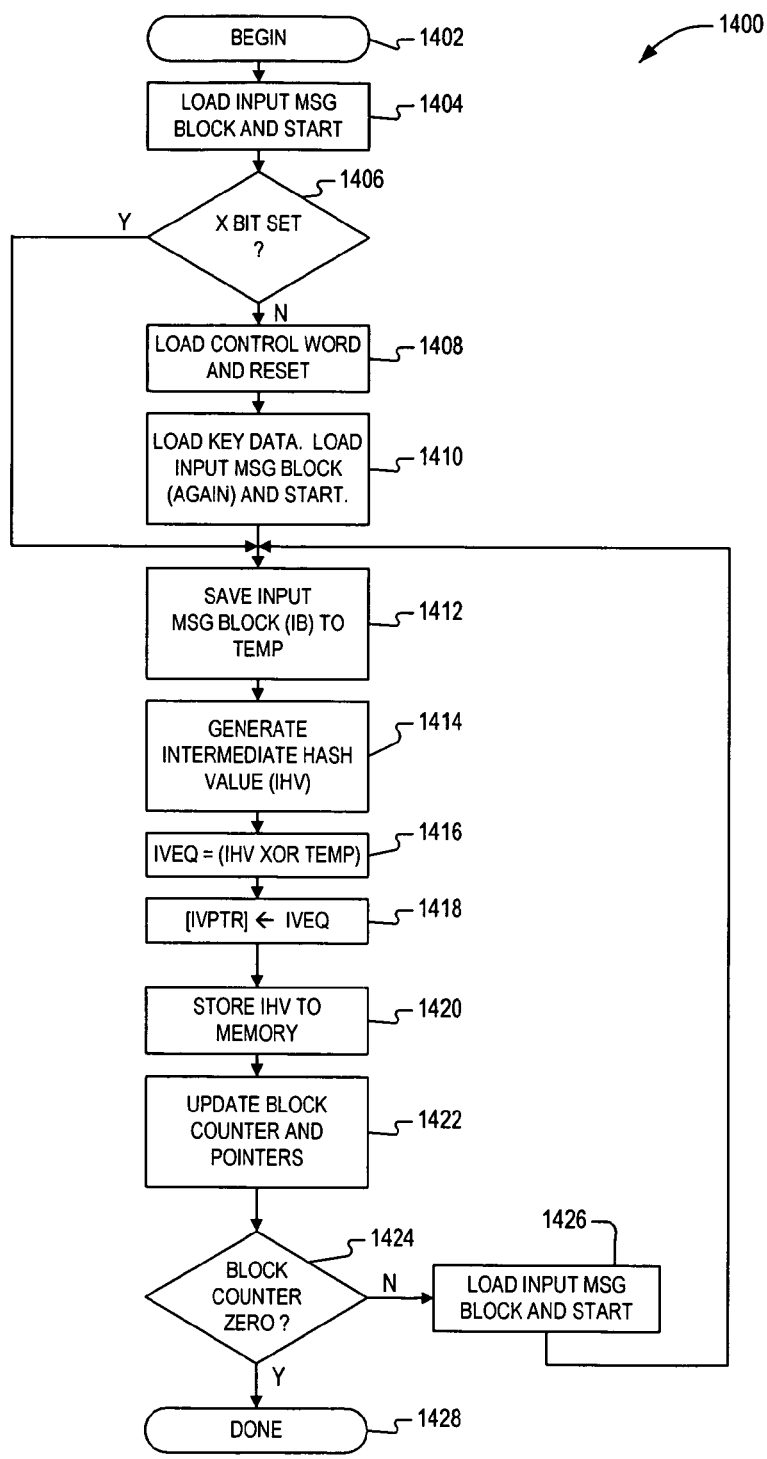
FIG. 14 is a flow chart depicting a method according to the present invention for employing a symmetric key algorithm to generate a message digest for a plurality of message blocks in the presence of one or more interrupting events.

Now referring to FIG. 14, a flow chart is provided depicting a method according to the present invention for employing a symmetric key algorithm to generate a message digest for a plurality of message blocks in the presence of one or more interrupting events. For purposes of teaching the present invention, steps are presented according to the output feedback block cipher mode, although one skilled in the art will appreciate that negligible changes are required when one of the other block cipher modes (e.g., CBC, CTR, CFB) are employed for generation of the message digest.

Flow begins at block 1402, where an XCRPYT instruction according to the present invention that directs the generation of a message digest begins execution. Execution of the XCRYPT instruction can be a first execution or it can be a first-execution following a first execution as a result of interruption of execution by an interrupting event such that program control is transferred back to the XCRYPT instruction after an interrupt handler has executed. Flow then proceeds to block 1404.

At block 1404, a message block in memory that is pointed to by contents of an input pointer register according to the present invention is loaded from the memory and a generation of the message digest according to a prescribed cryptographic operation is started. The specific input pointer register that is employed is determined by which particular cryptographic operation (e.g., encryption or decryption) is prescribed and also by which block cipher mode (e.g., CBC, CTR, CFB, or OFB) is prescribed. For example, if encryption is prescribed to generated the message digest using OFB mode, then both the input pointer register and an initialization pointer register are employed to load the data. Accordingly, the input pointer register points to a next message block to be encrypted, the result of which is an intermediate hash value. If generation of a message digest employs OFB mode decryption, then the input pointer register points to the same next message block, the a decryption algorithm is employed rather than encryption. In either case (i.e., OFB encryption or OFB decryption), the initialization vector register points to an initialization vector location in memory. For a first message block, contents of the initialization vector location in memory are an initialization vector. For subsequent message blocks, contents of the initialization vector location are output cipher blocks (i.e., intermediate hash values) corresponding to a preceding message block which are to be employed as an initialization vector equivalent for a current message block. Flow then proceeds to decision block 1406.

At decision block 1406, an evaluation is made to determine whether or not an X bit in a flags register is set. If the X bit is set, then it is indicated that the control word and key schedule currently loaded within a cryptography unit according to the present invention are valid. If the X bit is clear, then it is indicated that the control word and key schedule currently loaded within the cryptography unit are not valid. As alluded to above with reference to FIG. 13, the X bit is cleared when an interrupting event occurs. In addition, as noted above, when it is necessary to load a new control word or key schedule or both, it is required that instructions be executed to clear the X bit prior to issuing the XCRYPT instruction. In an X86-compatible embodiment that employs bit 30 within an X86 EFLAGS register, the X bit can be cleared by executing a PUSHFD instruction followed by a POPFD instruction. One skilled in the art will appreciate, however, that in alternative embodiments other instructions must be employed to clear the X bit. If the X bit is set, then flow proceeds to block 1412. IF the X bit is clear, then flow proceeds to block 1408.

At block 1408, since a cleared X bit has indicated that either an interrupting event has occurred or that a new control word and/or key data are to be loaded, a control word is loaded from memory. In one embodiment, loading the control word stops the cryptography unit from performing the prescribed cryptographic operation noted above with reference to block 1404. Starting a cryptographic operation in block 1404 in this exemplary embodiment allows for optimization of multiple block cryptographic operations by presuming that a currently loaded control word and key data are to be employed. Accordingly, the current block of input data is loaded and the cryptographic operation begun prior to checking the state of the X bit in decision block 1406. Flow then proceeds to block 1410.

At block 1410, key data (i.e., a cryptographic key or a complete key schedule) is loaded from memory. In addition, the input message block and initialization vector (or initialization vector equivalent) referenced in block 1404 are loaded again and the cryptographic operation is started according to the newly loaded control word and key schedule. Flow then proceeds to block 1412.

At block 1412, the input message block loaded in either block 1404 or block 1410 is saved to an internal register TEMP. Flow then proceeds to block 1414.

At block 1414, an intermediate hash value corresponding to the loaded message block is generated. Flow then proceeds to block 1416.

At block 1416, an initialization vector equivalent IVEQ is generated by exclusive-ORing the intermediate hash value with contents of TEMP. Flow then proceeds to block 1418.

At block 1418, the initialization vector equivalent IVEQ is written to the memory location pointed to by contents of the initialization vector pointer register IVPTR so that performance of the prescribed OFB mode cryptographic operation on a following input message block will employ the proper initialization vector equivalent. Flow then proceeds to block 1420.

The steps described within blocks 1412, 1414, 1416, and 1418 are required to ensure a state that will allow for execution of an XCRYPT instruction that employs the OFB mode of block cryptography to be interrupted at any time. For instance, in one embodiment, a page fault can occur at any point during execution of an XCRPYT instruction.

At block 1420, the generated intermediate hash value is stored to memory. Flow then proceeds to block 1422.

At block 1422, the contents of input block pointer register is modified to point to next input message block. Since this flow 1400 addresses generation of a message digest, the contents of the output pointer register are not changed so that each successive intermediate hash value that is generated is written over the previously generated valued, ultimately resulting in the message digest itself after the prescribed cryptographic operation is performed on the last block of the message. In addition, contents of the block counter register are modified to indicate completion of the cryptographic operation on the current input messgae block. In the embodiment discussed with reference to FIG. 14, the block counter register is decremented. One skilled in the art will appreciate, however, that alternative embodiments contemplate manipulation and testing of contents of the block count register to allow for pipelined execution of input message blocks as well. Flow then proceeds to decision block 1424.

At decision block 1424, an evaluation is made to determine if an input message block remains to be operated upon. In the embodiment featured herein, for illustrative purposes, the block counter is evaluated to determine if it equals zero. If no block remains to be operated upon, then flow proceeds to block 1428. If a block remains to be operated upon, then flow proceeds to block 1426.

At block 1426, the next block of input message data is loaded along with initialization vector equivalent, as pointed to by contents of the input pointer register and initialization vector register. Flow then proceeds to block 1412.

At block 1428, the method completes.

One skilled in the art will appreciate that the steps discussed with reference to blocks 1416, 1418, 1420, 1422, and 1424 could occur in a different order along their particular flow paths or they could occur in parallel.

Although the present invention and its objects, features, and advantages have been described in detail, other embodiments are encompassed by the invention as well. For example, the present invention has been discussed at length according to embodiments that are compatible with the x86 architecture. However, the discussions have been provided in such a manner because the x86 architecture is widely comprehended and thus provides a sufficient vehicle to teach the present invention. The present invention nevertheless comprehends embodiments that comport with other instruction set architectures such as PowerPC®, MIPS®, and the like, in addition to entirely new instruction set architectures.

The present invention moreover comprehends execution of cryptographic operations within elements of a computing system other than the microprocessor itself. For example, the cryptographic instruction according to the present invention could easily be applied within an embodiment of a cryptography unit that is not part of the same integrated circuit as a microprocessor that exercises as part of the computer system. It is anticipated that such embodiments of the present invention are in order for incorporation into a chipset surrounding a microprocessor (e.g., north bridge, south bridge) or as a processor dedicated for performing cryptographic operations where the cryptographic instruction is handed off to the processor from a host microprocessor. It is contemplated that the present invention applies to embedded controllers, industrial controllers, signal processors, array processors, and any like devices that are employed to process data. The present invention also comprehends an embodiment comprising only those elements essential to performing cryptographic operations as described herein. A device embodied as such would indeed provide a low-cost, low-power alternative for performing cryptographic operations only, say, as an encryption/decryption processor within a communications system. For clarity, the present inventors refer to these alternative processing elements as noted above as processors.

In addition, although the present invention has been frequently described in terms of 128-bit blocks, it is considered that various different block sizes can be employed by merely changing the size of registers that carry input data, output data, keys, and control words.

Furthermore, although DES, Triple-DES, and AES have been prominently featured in this application, the present inventors note that the invention described herein encompasses lesser known block cryptography algorithms as well such as the MARS cipher, the Rijndael cipher, the Twofish cipher, the Blowfish Cipher, the Serpent Cipher, and the RC6 cipher. What is sufficient to comprehend is that the present invention provides dedicated block cryptography apparatus and supporting methodology within a microprocessor where atomic message digest generation operations can be invoked via execution of a single instruction.

Finally, although the present invention has been specifically discussed as a single cryptography unit that supports a plurality of block cryptographic algorithms, the invention also comprehends provision of multiple cryptographic units operatively coupled in parallel with other execution units in a conforming microprocessor where each of the multiple cryptographic units is configured to perform a specific block cryptographic algorithm. For example, a first unit is configured for AES, a second for DES, and so on.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus, for accomplishing cryptographic operations, comprising:
   an x86-compatible complex instruction set computer (CISC) microprocessor, comprising:
   translation logic, configured to receive a single, atomic cryptographic instruction from a source therefrom, wherein said single, atomic cryptographic instruction prescribes generation of a message digest according to one of the cryptographic operations, and configured to translate said single, atomic cryptographic instruction into a sequence of micro instructions specifying sub-operations required to accomplish generation of said message digest according to said one of the cryptographic operations;
   execution logic, operatively coupled to said translation logic, configured to receive said sequence of micro instructions, and configured to perform said sub-operations to generate said message digest, said execution logic comprising:
   an x86 integer unit, an x86 floating point unit, an x86 MMX unit, and an x86 SSE unit, wherein a cryptography unit within said execution logic operates in parallel with said x86 integer unit, said x86 floating point unit, said x86 MMX unit, and said x86 SSE unit, to accomplish generation of said message digest.

2. The apparatus as recited in claim 1, wherein said one of the cryptographic operations comprises:
an encryption operation, said encryption operation comprising encryption of a plurality of message blocks to generate a corresponding plurality of intermediate hash values, wherein a final one of said intermediate has values is said message digest.

3. The apparatus as recited in claim 1, wherein said one of the cryptographic operations comprises:
a decryption operation, said decryption operation comprising decryption of a plurality of message blocks to generate a corresponding plurality of intermediate hash values, wherein a final one of said intermediate has values is said message digest.

4. The apparatus as recited in claim 1, wherein said one of the cryptographic operations is accomplished according to the Advanced Encryption Standard (AES) algorithm.

5. The apparatus as recited in claim 1, wherein said single, atomic cryptographic instruction prescribes a block cipher mode to be employed in accomplishing said one of the cryptographic operations.

6. The apparatus as recited in claim 5, wherein said block cipher mode comprises counter (CTR) mode.

7. The apparatus as recited in claim 5, wherein said block cipher mode comprises cipher block chaining (CBC) mode.

8. The apparatus as recited in claim 5, wherein said block cipher mode comprises cipher feedback mode (CFB) mode.

9. The apparatus as recited in claim 5, wherein said block cipher mode comprises output feedback (OFB) mode.

10. The apparatus as recited in claim 1, wherein said single, atomic cryptographic instruction is prescribed according to the x86 instruction format.

11. The apparatus as recited in claim 1, wherein said single, atomic cryptographic instruction implicitly references a plurality of registers within said x86-compatible CISC microprocessor.

12. The apparatus as recited in claim 11, wherein said plurality of registers comprises:
a first register, wherein contents of said first register comprise a first pointer to a first memory address, said first memory address specifying a first location in memory for access of a plurality of message blocks upon which said one of the cryptographic operations is to be accomplished for generation of said message digest.

13. The apparatus as recited in claim 11, wherein said plurality of registers comprises:
a first register, wherein contents of said first register comprise a first pointer to a first memory address, said first memory address specifying a first location in said memory for storage of a corresponding plurality of intermediate hash values, said corresponding plurality of intermediate hash values being generated as a result of accomplishing said one of the cryptographic operations upon a plurality of message blocks.

14. The apparatus as recited in claim 11, wherein said plurality of registers comprises:
a first register, wherein contents of said first register indicate a number of blocks within a plurality of message blocks.

15. The apparatus as recited in claim 11, wherein said plurality of registers comprises:
a first register, wherein contents of said first register comprise a first pointer to a first memory address, said first memory address specifying a first location in memory for access of cryptographic key data for use in accomplishing said one of the cryptographic operations.

16. The apparatus as recited in claim 11, wherein said plurality of registers comprises:
a first register, wherein contents of said first register comprise a first pointer to a first memory address, said first memory address specifying a first location in memory for access of an initialization vector for use in accomplishing said one of the cryptographic operations.

17. The apparatus as recited in claim 11, wherein said plurality of registers comprises:
a first register, wherein contents of said first register comprise a first pointer to a first memory address, said first memory address specifying a first location in memory for access of a control word for use in accomplishing said one of the cryptographic operations, wherein said control word prescribes cryptographic parameters for said one of the cryptographic operations.

18. An apparatus for performing cryptographic operations, comprising:
a single, atomic cryptographic instruction, received by logic within an x86-compatible CISC microprocessor, wherein said single, atomic cryptographic instruction prescribes generation of a message digest according to one of the cryptographic operations; and
execution logic, coupled to said logic, configured to perform said one of the cryptographic operations to generate said message digest, said execution logic comprising:
an x86 integer unit, an x86 floating point unit, an x86 MMX unit, and an X86 SSE unit, wherein a cryptography unit within said execution logic operates in parallel with said x86 integer unit, said x86 floating point unit, said x86 MMX unit, and said x86 SSE unit, to accomplish generation of said message digest.

19. The apparatus as recited in claim 18, wherein said one of the cryptographic operations comprises:
an encryption operation, said encryption operation comprising encryption of a plurality of message blocks to generate a corresponding plurality of intermediate hash values, a final one of said intermediate hash values being said message digest.

20. The apparatus as recited in claim 18, wherein said one of the cryptographic operations comprises:
a decryption operation, said decryption operation comprising decryption of a plurality of message blocks to generate a corresponding plurality of intermediate hash values, a final one of said intermediate hash values being said message digest.

21. The apparatus as recited in claim 18, wherein said one of the cryptographic operations is accomplished according to the Advanced Encryption Standard (AES) algorithm.

22. The apparatus as recited in claim 18, wherein said single, atomic cryptographic instruction prescribes a block cipher mode to be employed in accomplishing said one of the cryptographic operations.

23. The apparatus as recited in claim 22, wherein said block cipher mode comprises counter (CTR) mode.

24. The apparatus as recited in claim 22, wherein said block cipher mode comprises cipher block chaining (CBC) mode.

25. The apparatus as recited in claim 22, wherein said block cipher mode comprises cipher feedback mode (CFB) mode.

26. The apparatus as recited in claim 22, wherein said block cipher mode comprises output feedback (OFB) mode.

27. The apparatus as recited in claim 18, wherein said single, atomic cryptographic instruction is prescribed according to the x86 instruction format.

28. A method for performing cryptographic operations, the method comprising:
   fetching a single, atomic cryptographic instruction for execution by an x86-compatible CISC microprocessor, wherein the single, atomic cryptographic instruction prescribes generation of a message digest according to one of the cryptographic operations; and
   via a cryptography unit within the x86-compatible CISC microprocessor, generating the message digest by executing the one of the cryptographic operations, wherein said generating is accomplished in parallel with execution of other operations which are performed by an x86 integer unit, an x86 floating point unit, an x86 MMX unit, and an x86 SSE unit, wherein the x86 integer unit, the x86 floating point unit, the x86 MMX unit, and the x86 SSE unit are also disposed within the x86-compatible CISC microprocessor.

29. The method as recited in claim 28, wherein said receiving comprises:
   prescribing an encryption operation as the one of the cryptographic operations, wherein the encryption operation comprises encryption of a plurality of message blocks to generate a corresponding plurality of intermediate hash values, a final one of the intermediate hash values being the message digest.

30. The method as recited in claim 28, wherein said receiving comprises:
   prescribing a decryption operation as the one of the cryptographic operations, wherein the decryption operation comprises decryption of a plurality of message blocks to generate a corresponding plurality of intermediate hash values, a final one of the intermediate hash values being the message digest.

31. The method as recited in claim 28, wherein said generating comprises:
   accomplishing the one of the cryptographic operations according to the Advanced Encryption Standard (AES) algorithm.

32. The method as recited in claim 28, wherein said receiving comprises:
   specifying, within the single, atomic cryptographic instruction, a block cipher mode to be employed in accomplishing the one of the cryptographic operations to generate the message digest.

33. The method as recited in claim 32, wherein the block cipher mode comprises counter (CTR) mode.

34. The method as recited in claim 32, wherein the block cipher mode comprises cipher block chaining (CBC) mode.

35. The method as recited in claim 32, wherein the block cipher mode comprises cipher feedback mode (CFB) mode.

36. The method as recited in claim 32, wherein the block cipher mode comprises output feedback (OFB) mode.

37. The method as recited in claim 28, wherein said fetching comprises:
   prescribing the single, atomic cryptographic instruction according to the x86 instruction format.

* * * * *